United States Patent
Wang et al.

(10) Patent No.: US 12,120,756 B2
(45) Date of Patent: Oct. 15, 2024

(54) METHOD FOR DATA REPLICATION, DATA COUNTING METHOD, CORRESPONDING ENTITIES AND MEDIA

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 17/424,126

(22) PCT Filed: Jan. 23, 2020

(86) PCT No.: PCT/KR2020/001220
§ 371 (c)(1),
(2) Date: Jul. 19, 2021

(87) PCT Pub. No.: WO2020/159168
PCT Pub. Date: Aug. 6, 2020

(65) Prior Publication Data
US 2022/0124846 A1    Apr. 21, 2022

(30) Foreign Application Priority Data

Jan. 28, 2019 (CN) .......................... 201910083112.0
Apr. 28, 2019 (CN) .......................... 201910338518.9

(51) Int. Cl.
*H04W 76/12*    (2018.01)
*H04W 24/10*    (2009.01)
(Continued)

(52) U.S. Cl.
CPC .......... *H04W 76/12* (2018.02); *H04W 24/10* (2013.01); *H04W 28/0236* (2013.01); *H04W 28/0268* (2013.01); *H04W 92/20* (2013.01)

(58) Field of Classification Search
CPC ............. H04W 24/10; H04W 28/0236; H04W 28/0268; H04W 76/12
See application file for complete search history.

(56) References Cited

U.S. PATENT DOCUMENTS

| 10,172,166 B2 | 1/2019 | Xu et al. |
| 2018/0092014 A1 | 3/2018 | Gao et al. |

(Continued)

FOREIGN PATENT DOCUMENTS

| EP | 3637846 A1 | 4/2020 |
| EP | 3737185 A1 | 11/2020 |

(Continued)

OTHER PUBLICATIONS

International Search Report dated Jul. 17, 2020 in connection with International Patent Application No. PCT/KR2020/001220, 4 pages.

(Continued)

*Primary Examiner* — Melanie Jagannathan

(57) ABSTRACT

The present disclosure provides a method for establishing a default radio data bearer on a secondary base station, and a corresponding master base station, secondary base station, and computer readable media. The method includes: notifying the secondary base station to establish the default radio data bearer; receiving, from the secondary base station, a notification of information about establishment of the default radio data bearer; and receiving, from the secondary base station, a notification of information about release of the default radio data bearer. The present disclosure also provides a method for data replication and data transmission performed by an entity where PDCP is located, a method for data replication performed by an entity where RLC is (Continued)

located, a data counting method performed by an entity where RLC is located, an entity where PDCP is located, an entity where RLC is located, and a computer readable medium.

16 Claims, 14 Drawing Sheets

(51) Int. Cl.
*H04W 28/02* (2009.01)
*H04W 92/20* (2009.01)

(56) References Cited

U.S. PATENT DOCUMENTS

| | | | |
|---|---|---|---|
| 2018/0332494 A1 | 11/2018 | Hou | |
| 2018/0359800 A1 | 12/2018 | Wu | |
| 2019/0159086 A1 | 5/2019 | Xu et al. | |
| 2019/0335534 A1* | 10/2019 | Atarius | H04L 65/1016 |
| 2020/0170003 A1* | 5/2020 | Kim | H04L 5/0032 |
| 2021/0105847 A1* | 4/2021 | Prabhakar | H04W 76/19 |
| 2022/0070888 A1* | 3/2022 | Venkata | H04W 72/56 |

FOREIGN PATENT DOCUMENTS

| | | |
|---|---|---|
| EP | 3905763 A1 | 11/2021 |
| WO | 2016/060483 A1 | 4/2016 |
| WO | 2018/203739 A1 | 11/2018 |
| WO | 2018202153 A1 | 11/2018 |

OTHER PUBLICATIONS

Written Opinion of the International Searching Authority dated Jul. 17, 2020 in connection with International Patent Application No. PCT/KR2020/001220, 5 pages.

Supplementary European Search Report dated Dec. 6, 2021, in connection with European Application No. 20748582.2, 7 pages.

Communication pursuant to Article 94(3) EPC, dated Feb. 10, 2023, in connection with European Patent Application No. 20748582.2, 6 pages.

* cited by examiner

METHOD FOR DATA REPLICATION, DATA COUNTING METHOD, CORRESPONDING ENTITIES AND MEDIA

CROSS-REFERENCE TO RELATED APPLICATIONS

This application is a 371 of International Application No. PCT/KR2020/001220 filed on Jan. 23, 2020, which claims priority to Chinese Patent Application No. 201910083112.0 filed on Jan. 28, 2019 and Chinese Patent Application No. 201910338518.9 filed on Apr. 28, 2019, the disclosures of which are herein incorporated by reference in their entirety.

BACKGROUND

1. Field

The present disclosure relates to the field of wireless communication technology, and more particularly, to a method for data replication, a data counting method, a corresponding entity, and a computer readable medium in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

According to the current technology, whether the uplink data is to be replicated is determined by the MAC layer of the base station. If the UE is connected to multiple MAC layers, each MAC makes its decision based on its own signal quality without knowing the signal quality measured by other MAC layers, such that the decisions made by the MACs may be conflicting. For example, one MAC layer sends replication activation to the UE, and another MAC layer sends replication deactivation to the UE. Alternatively, there may be more than two MAC layers making the same decision, and the decisions of the MACs are sent to the UE. No matter whether the decisions of multiple MAC layers are in conflict, or the same decision is made by more than two MACs, it depends on the implementation of the UE to resolve. As a result, the replicated data may not be transmitted on the best two links, and thus may not meet the quality requirements of the service.

SUMMARY

The present disclosure provides a technical solution for dynamically configuring a PDCP data packet replication function and dynamically configuring transmission paths of replicated PDCP data packets through a PDCP data packet replication control process of the present disclosure under a 5G architecture, which is able to effectively improve the data transmission success rate, reduce the data transmission delay, thereby meeting the service requirements of high reliability and low delay.

According to a first aspect of the present disclosure, a method for data replication and data transmission performed by an entity where PDCP is located is provided. The method includes: sending report configuration information to an entity where RLC is located, the report configuration information including an indication of report information required to be obtained for the entity where the RLC is located; receiving the report information from the entity where the RLC is located; and sending a data replication activation indication to the entity where the RLC is located.

In an exemplary embodiment, the report information includes at least one of:
channel quality related information of a transmission path,
indication information for activation or deactivation of uplink and/or downlink data replication, wherein the indication information is determined by the entity where the RLC is located according to at least the channel quality related information of the transmission path and/or a data replication activation threshold.

In an exemplary embodiment, the channel quality related information of the transmission path includes at least one of:
 a measurement value of channel quality,
 a level of channel quality,
 a difference between the measurement value of channel quality and the data replication activation threshold.

In an exemplary embodiment, the report configuration information further includes at least one of:
 report trigger condition information; and
 a data replication activation threshold, wherein the data replication activation threshold is determined by the entity where the PDCP is located according to the channel quality related information of the transmission path of each entity where the RLC is located to which the entity where the PDCP is located is connected.

In an exemplary embodiment, the method further includes: determining whether to activate a downlink data replication according to the received report information, and if it is determined that the downlink data replication is to be activated, selecting at least two transmission paths for transmitting replicated downlink data.

In an exemplary embodiment, the method further includes: determining whether to activate an uplink data replication according to the received report information, and if it is determined that uplink data replication is to be activated, selecting at least two transmission paths for transmitting replicated uplink data; and sending an uplink data replication activation indication to the entity where the RLC is located of each of the at least two selected transmission paths for indicating that replicated uplink data is to be transmitted on the transmission path.

In an exemplary embodiment, the method further includes: sending a data replication activation threshold to the entity where the RLC is located, so that the entity where the RLC is located determines whether to activate uplink and/or downlink data replication according to the data replication activation threshold; and sending, to the UE, a MAC CE indicating activation of the uplink data replication and signal quality related information if the entity where the RLC is located determines to activate the uplink data replication, wherein the data replication activation threshold is determined by the entity where the PDCP is located according to the channel quality related information of the transmission path of each entity where the RLC is located to which the entity where the PDCP is located is connected.

According to a second aspect of the present disclosure, a method for data replication performed by an entity where RLC is located is provided. The method includes: receiving report configuration information from an entity where PDCP is located, the report configuration information including an indication of report information required to be obtained for the entity where the RLC is located; sending the report information to the entity where the PDCP is located; receiving a data replication activation threshold from the entity where the PDCP is located, wherein the data replication activation threshold is determined by the entity where the PDCP is located according to channel quality related information of a transmission path of each entity where the RLC is located to which the entity where the PDCP is located is connected; and determining whether to activate uplink and/or downlink data replication according to the received data replication activation threshold.

In an exemplary embodiment, the report information includes at least one of:
 channel quality related information of the transmission path,
 indication information for activation or deactivation of uplink and/or downlink data replication, wherein the indication information is determined by the entity where the RLC is located according to the channel quality related information of the transmission path and/or the data replication activation threshold.

In an exemplary embodiment, the channel quality related information of the transmission path includes at least one of:
 a measurement value of channel quality,
 a level of channel quality,
 a difference between the measurement value of channel quality and the data replication activation threshold.

In an exemplary embodiment, the report configuration information further includes at least one of:
 report trigger condition information; and
 the data replication activation threshold, wherein the data replication activation threshold is determined by the entity where the PDCP is located according to the channel quality related information of the transmission path of each entity where the RLC is located to which the entity where the PDCP is located is connected.

In an exemplary embodiment, the method further includes:
 when it is determined to activate the downlink data replication, sending replicated downlink data to the UE,
 when it is determined to activate the uplink data replication, setting a MAC CE to indicate activation of the uplink data replication, and sending, to the UE, the MAC CE indicating the activation of the uplink data replication and signal quality related information.

In an exemplary embodiment, the method further includes: when it is determined to activate uplink data replication, setting the MAC CE to indicate uplink data replication activation, and sending, to the UE, the MAC CE indicating activation of uplink data replication and channel quality related information.

In an exemplary embodiment, when the entity where the PDCP is located determines to activate the uplink data replication according to the report information, and selects a transmission path connected to the entity where the RLC is located as a transmission path for transmitting replicated uplink data, the method further includes: receiving, from the entity where the PDCP is located, an uplink data replication activation indication for indicating to transmit the replicated uplink data on the transmission path; according to the received uplink data replication activation indication, setting the MAC CE to indicate the activation of the uplink data replication; and sending, to the UE, the MAC CE indicating the activation of the uplink data replication.

According to a third aspect of the present disclosure, a data counting method performed by an entity where RLC is located is provided. The method includes: receiving indication information for data replication; and counting data packets according to the indication information for data replication.

In an exemplary embodiment, the entity where the RLC is located receives the indication information for data replication through a message or through a user plane.

According to a fourth aspect of the present disclosure, a method for establishing a default radio data bearer on a secondary base station is provided. The method includes: notifying the secondary base station to establish the default radio data bearer; receiving, from the secondary base station, a notification of information about establishment of the default radio data bearer; and receiving, from the secondary base station, a notification of information about release of the default radio data bearer.

In an exemplary embodiment, the method further includes: notifying the secondary base station of an identifier of the default radio data bearer.

In an exemplary embodiment, the method further includes: notifying the secondary base station of information of an uplink tunnel corresponding to the established default radio data bearer.

In an exemplary embodiment, the method further includes: receiving, from the secondary base station, a notification that the information about establishment of the default radio data bearer comprises an identifier of the default radio data bearer.

In an exemplary embodiment, the method further includes: receiving, from the secondary base station, a notification about an identifier of a data stream on the default data bearer received by the secondary base station; notifying the secondary base station of information of an uplink tunnel corresponding to the data stream; and receiving data of the data stream from the secondary base station.

In an exemplary embodiment, the method further includes: establishing the default radio data bearer, and sending a message to a UE to notify information of the new default radio data bearer.

According to a fifth aspect of the present disclosure, a method for establishing a default radio data bearer on a secondary base station is provided. The method includes: receiving, from a master base station, a notification which notifies the secondary base station to establish the default radio data bearer; notifying the master base station of information about establishment of the default radio data bearer; and notifying the master base station of information about release of the default radio data bearer.

In an exemplary embodiment, the method further includes: receiving, from the master base station, a notification of an identifier of the default radio data bearer.

In an exemplary embodiment, the method further includes: receiving, from the master base station, a notification of information of an uplink tunnel corresponding to the established default radio data bearer.

In an exemplary embodiment, the method further includes: notifying the master base station that the information about establishment of the default radio data bearer comprises an identifier of the default radio data bearer.

In an exemplary embodiment, the method further includes: notifying the master base station of an identifier of a data stream on the default data bearer received by the secondary base station; receiving, from the master base station, a notification of information of an uplink tunnel corresponding to the data stream; and sending data of the data stream to the master base station.

According to a sixth aspect of the present disclosure, an entity where PDCP is located is provided. The entity where the PDCP is located includes: a processor; and a memory storing computer executable instructions that, when executed by the processor, cause the device to execute the method according to the first aspect or the fourth aspect of the present disclosure.

In an exemplary embodiment, the entity where the PDCP is located includes one of:
 a master base station,
 a secondary base station,
 a center control node.

According to a seventh aspect of the present disclosure, an entity where RLC is located is provided. The entity where the RLC is located includes: a processor; and a memory storing computer executable instructions that, when executed by the processor, cause the device to execute the method according to the second aspect, the third aspect, or the fifth aspect of the present disclosure.

In an exemplary embodiment, the entity where the RLC is located includes one of:
 a master base station,
 a secondary base station,
 a distributed entity.

According to an eighth aspect of the present disclosure, there is provided a computer readable medium having stored thereon instructions that, when executed by a processor, cause the processor to execute the method according to the first aspect, the second aspect, the third aspect, the fourth aspect, or the fifth aspect of the present disclosure.

According to the technical solution of the present disclosure, the UE may access the network more quickly and complete data transmission more quickly.

And in the 5G architecture, the data counting method of the present disclosure may avoid repetitive counting of the replicated data packets, improve the accuracy of the counting, and avoid repeated accounting.

BRIEF DESCRIPTION OF THE DRAWINGS

The foregoing and/or additional aspects and advantages of the present disclosure will become apparent and readily appreciated from the following description of the embodiments in connection with the accompanying drawings, in which.

DETAILED DESCRIPTION

Figure 1:
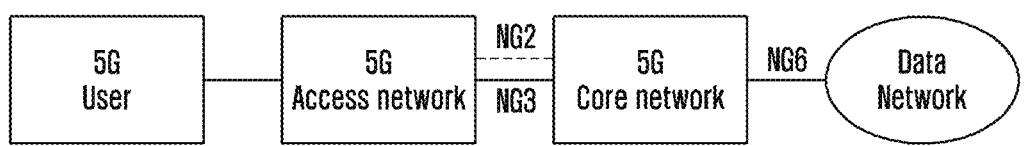
FIG. 1 schematically illustrates a 5G system architecture diagram.

Hereinafter, embodiments of the present disclosure will be described in detail. Examples of the embodiments are shown in the accompanying drawings, wherein the same or similar reference numerals represent the same or similar elements or elements having the same or similar functions throughout. The embodiments described below with reference to the drawings are exemplary, and are only used to explain the present disclosure, and should not be construed as limiting the present disclosure.

Those skilled in the art will understand that, unless specifically stated otherwise, the singular forms "a", "an", "said" and "the" may include plural forms. It should be further understood that the term "including" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it may be directly connected or coupled to the other element, or intervening elements may also be present. Furthermore, "connected" or "coupled" as used herein may include "wirelessly connected" or "wirelessly coupled". As used herein, the term "and/or" includes all or any of the elements and all combinations of one or more of the associated listed items.

It will be understood by those skilled in the art that, unless otherwise defined, all terms (including technical and scientific terms) used herein have the same meaning as commonly understood by one of ordinary skill in the art to which this disclosure belongs. It should also be understood that terms such as those defined in the general dictionary should be understood to have meanings consistent with the meanings in the context of the prior art, and will not be interpreted in idealized or overly formal terms unless specifically defined like this.

Those skilled in the art may understand that "terminal" and "terminal equipment" as used herein include both wireless signal receiver devices (devices with only wireless signal receivers that do not have the ability to transmit) and devices including receiving and transmitting hardware (devices with receiving and transmitting hardware capable of performing two-way communication on a two-way communication link). Such devices may include: cellular or other communication devices, which have a single-line display or multi-line display, or cellular or other communication devices without a multi-line display; PCS (Personal Communications Service), which may combine voice and data processing, fax and/or data communication capabilities; PDA (Personal Digital Assistant), which may include RF receivers, pagers, Internet/Intranet access, web browsers, notepads, calendars, and/or GPS (Global Positioning System) receivers; conventional laptop and/or palmtop computer or other devices having and/or including a RF receiver.

The "Terminal", "terminal equipment" as used herein may be portable, transportable, installed in a vehicle (air, sea and/or land), or suitable and/or configured to operate locally, and/or operate in a distributed form on any other location on Earth and/or space. The "terminal" and "terminal equipment" as used herein may also be communication terminals, Internet terminals, music/video playback terminals, such as PDA, MID (Mobile Internet Device), and/or mobile phones with music/video playback functions, or devices such as smart TVs and set-top boxes.

5G refers to the fifth generation mobile communication technology. Unlike the previous four generations, 5G is not a single wireless technology, but a fusion of existing wireless communication technologies. At present, the peak rate of LTE can reach 100 Mbps, and the peak rate of 5G will reach 10 Gbps, which is 100 times higher than 4G. The existing 4G network has limited processing spontaneity and cannot support some high-definition video, high-quality voice, augmented reality, and virtual reality services. 5G will introduce more advanced technologies. Through higher spectrum efficiency, more spectrum resources, and denser cells, 5G will meet the needs of mobile service traffic growth, solve the problems with 4G networks, and build a network with high transmission rate, high capacity, low latency, high reliability, and excellent user experience. As shown in FIG. 1, the 5G architecture includes a 5G access network and a 5G core network. User equipment (UE) communicates with the data network through the access network and the core network.

Figure 2:
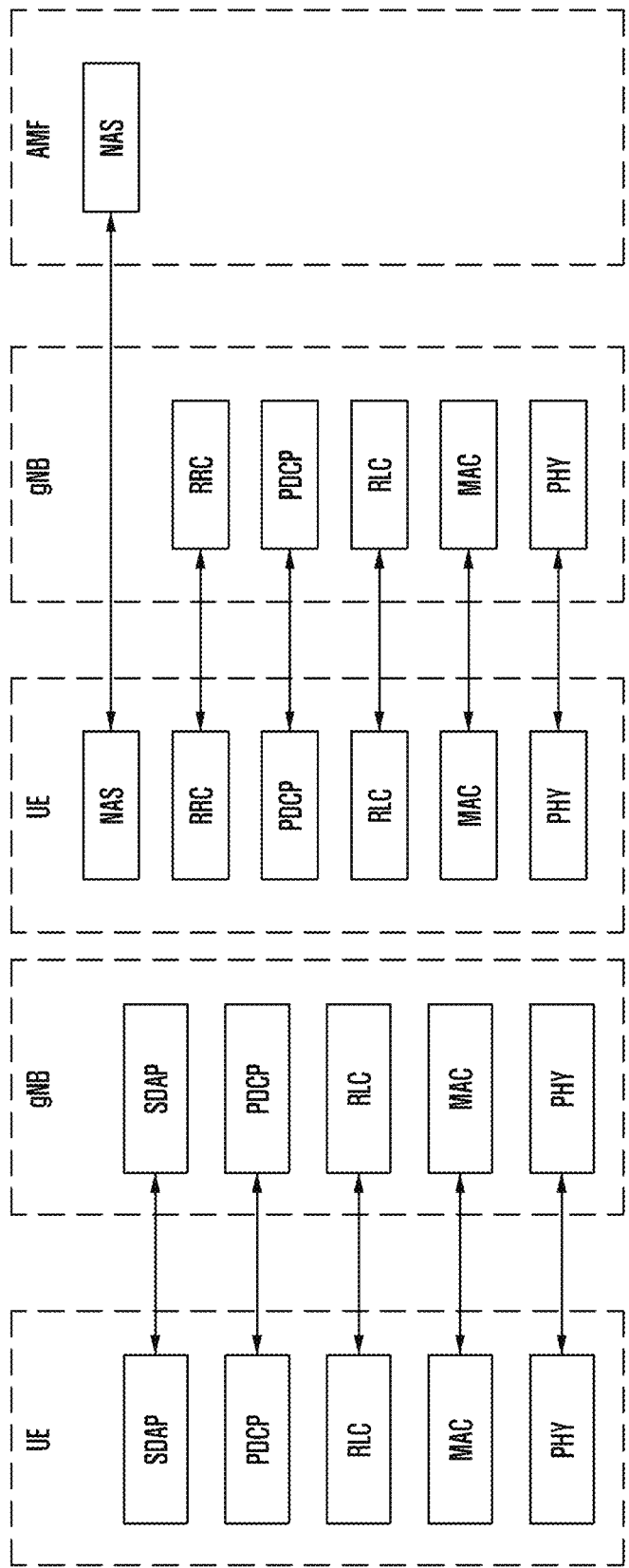
FIG. 2 schematically illustrates a base station protocol architecture diagram.

The 5G access network includes a 5G base station gNB and an LTE base station eNB connected to the 5G core network, which is collectively referred to as NG-RAN. The protocol stacks on the base station are shown in FIG. 2. The user plane of the base station includes the Service Data Adaptation Protocol (SDAP), Packet Data Convergence Protocol (PDCP), Radio Link Control (RLC) protocol, Media Access Control (MAC) Protocol and the physical layer. The control plane of the base station includes the radio resource control (RRC) protocol, PDCP, RLC, MAC, and the physical layer. The control plane of the base station also supports the interface protocol Xn between the base stations, as well as the protocol NG between the base station and the core network.

5G needs to support higher service rates and stricter delay requirements, such as reliable low-latency services (Ultra-Reliable and Low Latency Communications, URLLC). To support reliable low-latency services, in order to support low-latency, shorter transmission slots are introduced, and to support reliability, a data replication transmission mechanism is introduced. Data replication is performed at the PDCP protocol layer. A data packet is replicated into two identical data packets. When a data packet is replicated, the original data packet and the replicated data packet cannot be transmitted on the same carrier. Two transmissions paths may belong to the same MAC or to different RLCs/MACs. If the same MAC is used, it is necessary to ensure that the logical channel transmitting the original data packet and the logical channel transmitting the replicated data packet are not mapped on the same carrier. If they belong to different RLCs/MACs, the two copies of data packets are transmitted to two different RLC entities, respectively.

The uplink PDCP protocol stack is implemented at the UE. Whether the uplink PDCP has the function of data packet replication is configured to the UE by radio resource control signaling (RRC signaling). If the PDCP of a data bearer is configured with the replication function, the master base station notifies the secondary base station of the initial state of the uplink PDCP replication function through Xn interface signaling during the establishment of the dual connectivity, and the master base station notifies the UE through RRC signaling whether the initial state of the uplink PDCP is replication activation or replication deactivation. Afterwards, for the uplink, the MAC layer of the base station decides whether to activate uplink data packet replication, and notifies to the UE in the MAC CE data packet. In the case of dual connectivity, the MAC CEs of the master cell group (MCG) and the secondary cell group (SCG) are sent separately. When replication is deactivated, the secondary RLC protocol layer does not need to be rebuilt, the HARQ buffer is not cleared, and the uplink PDCP protocol informs the secondary RLC protocol layer of discarding all the replicated data packets.

The downlink PDCP protocol stack is implemented at the base station, and may be implemented on the master base station or the secondary base station. When the master base station decides to establish a dual connectivity, the master base station determines whether the PDCP protocol stack is located at the master base station or the secondary base station, determines whether the PDCP is to be configured with the replication function (including uplink and downlink PDCP replication function), and then for the downlink, the PDCP layer of the base station determines whether to activate downlink data packet replication. If activated, the PDCP replicates the data packets and sends them to two RLC protocol layers. The PDCP may obtain some auxiliary information from the secondary RLC to help PDCP decide whether to activate the replication function, or the secondary RLC may suggest whether the PDCP needs to activate the replication function. When the replication is deactivated, the secondary RLC protocol layer does not need to be rebuilt, the HARQ buffer is not cleared, and the downlink PDCP protocol informs the secondary RLC protocol layer of discarding all the replicated data packets.

When the RLC layer acknowledges that a PDCP data packet is transmitted successfully, the successfully transmitted PDCP protocol layer needs to notify another RLC protocol of discarding this data packet. When the number of retransmissions of the secondary RLC protocol layer reaches the maximum, the UE needs to notify the base station of this situation, and the UE does not initiate a wireless connection failure process.

Through the PDCP replication function, the same data packet is transmitted twice, one through the RLC entity located at the master base station, and the other through the RLC entity on the secondary base station. Through two unrelated transmissions, the reliability of the transmission is improved and the transmission delay is reduced, which is very important for URLCC services.

However, when the UE is located at the edge of a cell, or for services with particularly high reliability requirements, the service requirements still cannot be met through two-way replication. If the signal quality of one path deteriorates, the requirement for reliable transmission cannot be achieved. Therefore, it is necessary to consider establishing more than two transmission paths, and selecting the best two of the paths for transmission. This selection is dynamic and needs to be selected according to the signal quality. According to the current technology, whether the uplink data is to be replicated is determined by the MAC layer of the base station. If the UE is connected to multiple MAC layers, each MAC makes its decision based on its own signal quality without knowing the signal quality measured by other MAC layers, such that the decisions made by the MACs may be conflicting. For example, one MAC layer sends replication activation to the UE, and another MAC layer sends replication deactivation to the UE. Alternatively, there may be more than two MAC layers making the same decision, and the decisions of the MACs are sent to the UE. No matter whether the decisions of multiple MAC layers are in conflict, or the same decision is made by more than two MACs, it depends on the implementation of the UE to resolve. As a result, the replicated data may not be transmitted on the best two links, and thus may not meet the quality requirements of the service.

In addition, if the performance of the UE, e.g., the data amount of the UE, or the throughput of the UE, needs to be counted, the counting is made for one data wireless connection or for several data wireless connections required by the same service. When the PDCP replication is activated, the downlink data received from the core network is replicated by the PDCP as two copies and sent to the UE through two paths. The same data packets are transmitted on the two paths. The current technology does not concern whether these data packets need to be counted and how to count these data packets.

In order to make the purpose, technical means, and advantages of the present disclosure clearer, the present disclosure is further described in detail below with reference to the drawings.

Figure 3:
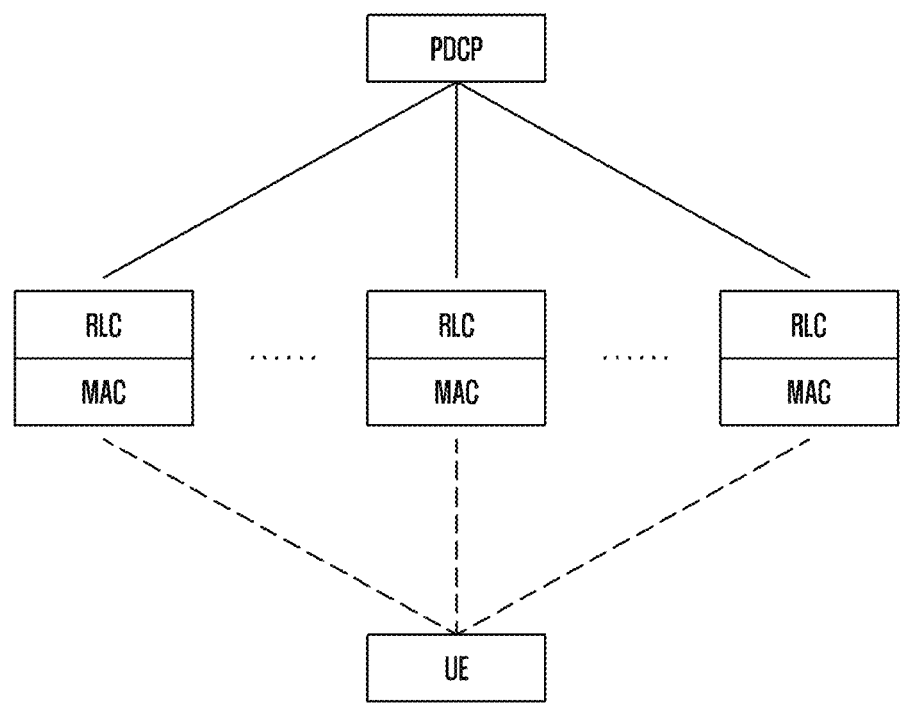
FIG. 3 schematically illustrates a system architecture diagram to which an exemplary embodiment of the present disclosure is applied.

FIG. 3 schematically illustrates a system architecture diagram to which an exemplary embodiment of the present disclosure is applied.

As shown in FIG. 3, a certain data bearer corresponds to a PDCP protocol layer and a plurality of RLC protocol layers. The PDCP protocol layer and the RLC protocol layers are arranged on different base stations. For example, the PDCP protocol layer is arranged on the master base station, the RLC protocol layers are arranged on the secondary base stations, and there is an Xn interface between the master base station and each of the secondary base stations. Alternatively, the PDCP protocol layer and the RLC protocol layers are arranged on different entities. For example, the PDCP is arranged on a central control node, RLCs, MACs and physical layers are arranged on distributed entities, and there is an F1 interface between the central control node and each of the distributed entities. The PDCP may also be arranged on the same entity as one of the RLCs. For example, the PDCP and one of the RLCs, MACs, and physical layers are arranged on the master base station, and other RLCs, MACs, and physical layers are arranged on different base stations.

Herein, the base station or the central control node where the PDCP protocol layer is located is collectively referred to as an entity where the PDCP is located, and the base station or the distributed entity where the RLC, MAC and physical layer are located is collectively referred to as an entity where the RLC is located.

A data tunnel is established between a PDCP protocol layer and an RLC protocol layer, and a data tunnel is identified by two tunnel numbers, which are respectively allocated by the entity where the PDCP is located and the entity where the RLC is located. Alternatively, two data tunnels are established between a PDCP and an RLC. The downlink data transmission path of a bearer means that the PDCP data packet is sent to the RLC protocol layer through a tunnel, and then sent to the UE through the RLC, MAC, and physical layer. The uplink data transmission path means that the uplink PDCP data packet is sent by the UE to the entity where the RLC is located, and then sent to the entity where PDCP is located through a tunnel. The base station in which the master cell is located is referred to as a master base station, and the base station in which the secondary cell is located is referred to as a secondary base station. The PDCP may be established on the master base station or on the secondary base station. The master base station and the secondary base station may be eNBs connected to the 5G core network, may be gNBs, or may be nodes supporting non-3GPP access technologies. There is only one master base station but one or more secondary base stations. In general, more than two data transmission paths are established between the base station and the UE, and PDCP may choose two of them to send data packets on the same data radio bearer.

Hereinafter, a method for data replication performed at an entity where PDCP is located according to an exemplary embodiment of the present disclosure will be described in detail with reference to FIG. 4. The entity where the PDCP is located may be a master base station, a secondary base station, or a central control node.

Figure 4:
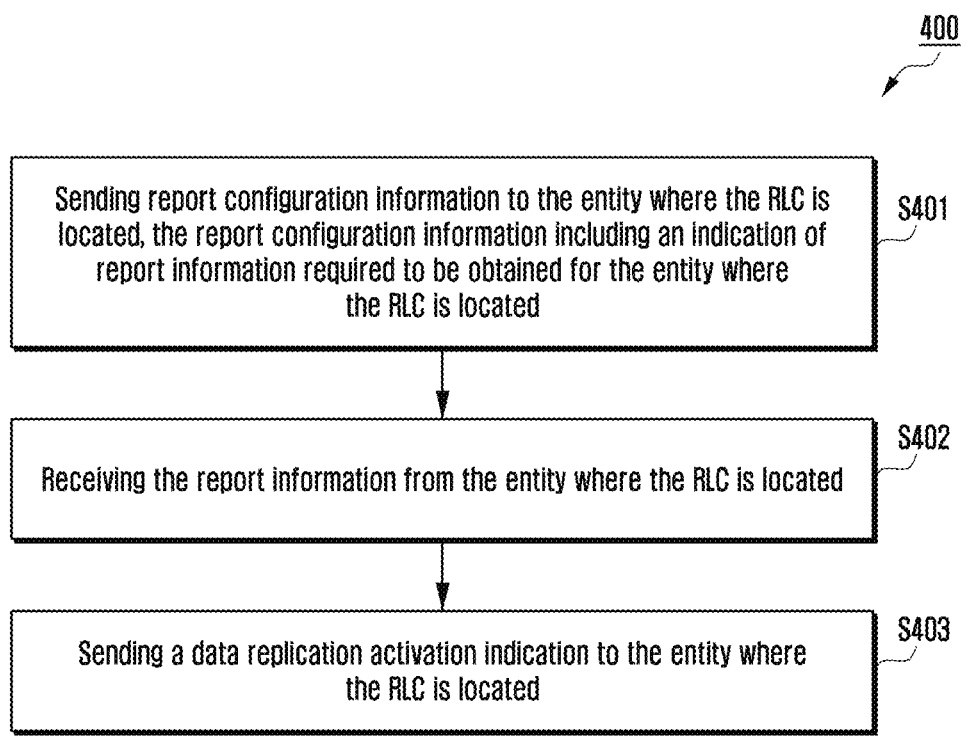
FIG. 4 schematically illustrates a flowchart of a method for data replication performed at an entity where PDCP is located according to an exemplary embodiment of the present disclosure.

FIG. 4 schematically illustrates a flowchart of a method 400 for data replication performed at an entity where PDCP is located according to an exemplary embodiment of the present disclosure.

As shown in FIG. 4, the method 400 includes steps S401 to S403.

In step S401, the entity where the PDCP is located may send report configuration information to the entity where the RLC is located. The entity where the RLC is located may be a master base station, a secondary base station, or a distributed entity. The report configuration information includes an indication of the report information required to be obtained for the entity where the RLC is located.

In an exemplary embodiment, the report information may include at least one of:
channel quality related information of the transmission path,
indication information for activation or deactivation of uplink and/or downlink data replication, wherein the indication information is determined by the entity where the RLC is located at least according to channel quality related information of the transmission path and/or a data replication activation threshold.

In an exemplary embodiment, the channel quality related information of the transmission path may include at least one of:
a measurement value of channel quality,
a level of channel quality,
a difference between the measurement value of channel quality and the data replication activation threshold.

In step S402, the entity where the PDCP is located may receive report information from the entity where the RLC is located. The report information is used to assist the entity where the PDCP is located to determine activation or deactivation of data replication.

Figure 6:
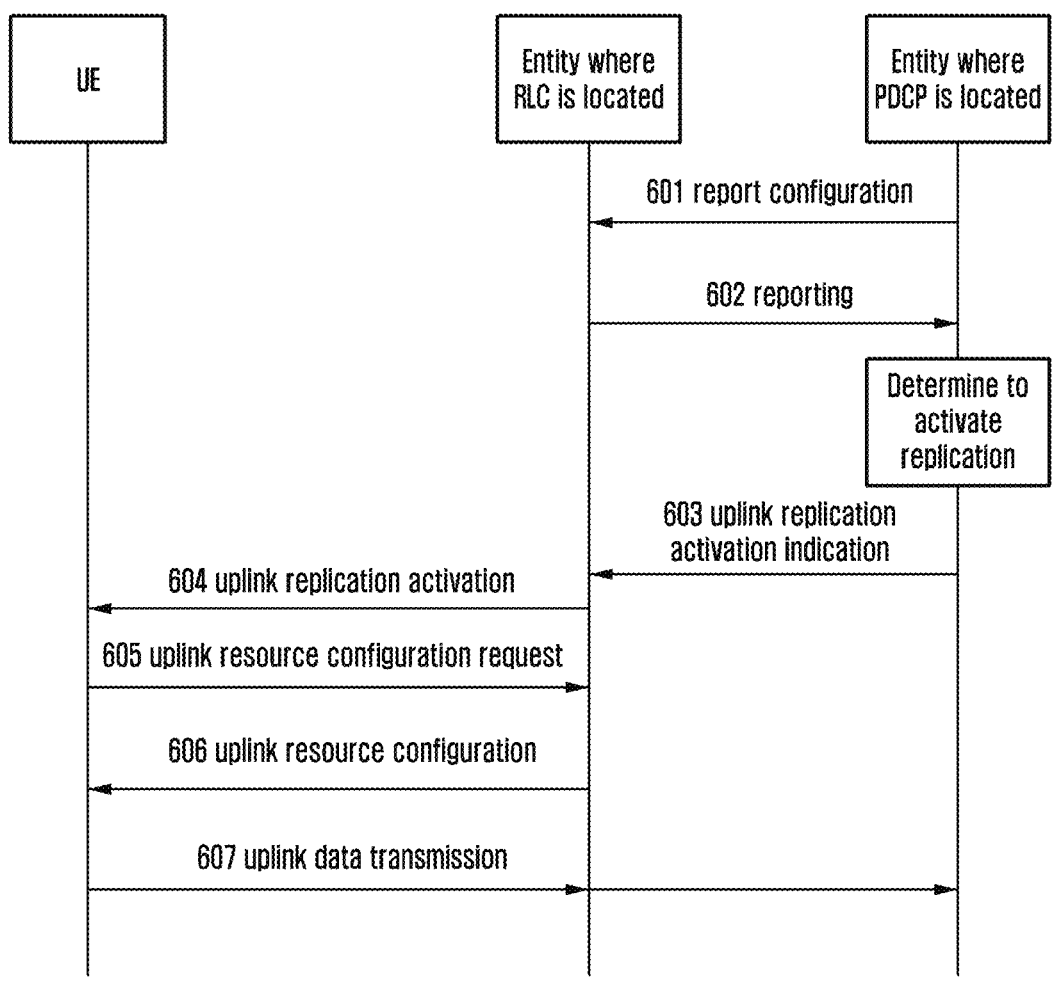
FIG. 6 schematically illustrates a signaling flowchart for data replication and data transmission according to a first exemplary embodiment of the present disclosure.

In the first exemplary embodiment shown in FIG. 6, which will be described in detail later, the report configuration information may further include at least one of:
report trigger condition information; and
a data replication activation threshold, wherein the data replication activation threshold is determined by the entity where the PDCP is located according to the channel quality related information of the transmission path of each entity where the RLC is located to which the entity where the PDCP is located is connected.

In this case, the method 400 may further include step S403, in which the entity where the PDCP is located may send a data replication activation indication to the entity where the RLC is located. Specifically, the entity where the PDCP is located may determine whether to activate the downlink data replication according to the received report information, and if it is determined that downlink data replication is to be activated, select at least two transmission paths for transmitting replicated downlink data. Alternatively, the entity where the PDCP is located may determine whether to activate the uplink data replication according to the received report information, and if it is determined that uplink data replication is to be activated, select at least two transmission paths for transmitting replicated uplink data; and send an uplink data replication activation indication to the entity where the RLC is located of each of the at least two selected transmission paths for indicating that replicated uplink data is to be transmitted on the transmission path.

Figure 7:
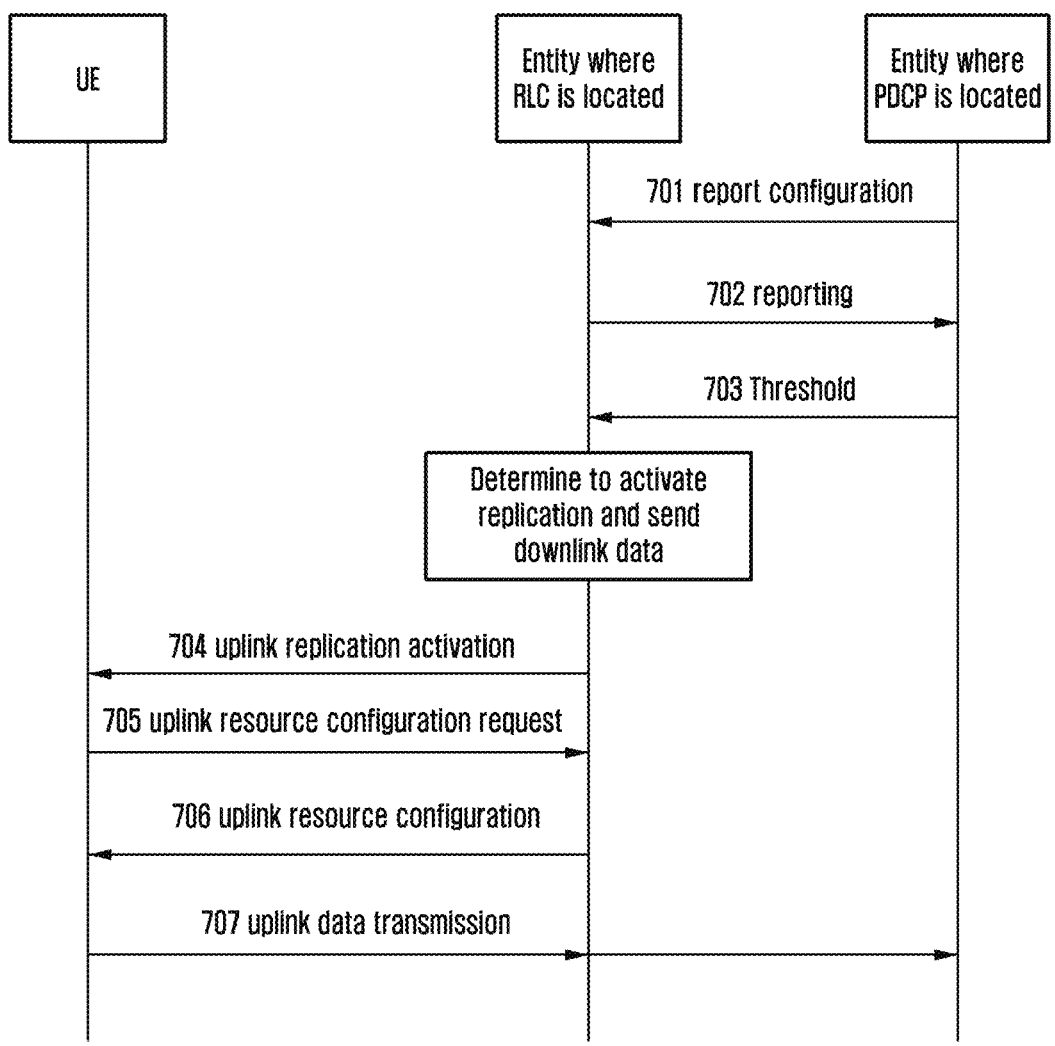
FIG. 7 schematically illustrates a signaling flowchart for data replication and data transmission according to a second exemplary embodiment of the present disclosure.

Alternatively, in the second exemplary embodiment shown in FIG. 7, which will be described in detail later, the method 400 may include: sending a data replication activation threshold to the entity where the RLC is located, so that the entity where the RLC is located determines whether to activate uplink and/or downlink data replication according to the data replication activation threshold; and sending, to the UE, a MAC CE indicating the activation of the uplink data replication and signal quality related information if the entity where the RLC is located determines to activate uplink data replication. The data replication activation threshold is determined by the entity where the PDCP is located according to the channel quality related information of the transmission path of each entity where the RLC is located to which the entity where the PDCP is located is connected.

Hereinafter, a method for data replication performed at an entity where the RLC is located according to an exemplary embodiment of the present disclosure will be described in detail with reference to FIG. 5. As mentioned above, the entity where the RLC is located may be a master base station, a secondary base station, or a distributed entity.

Figure 5:
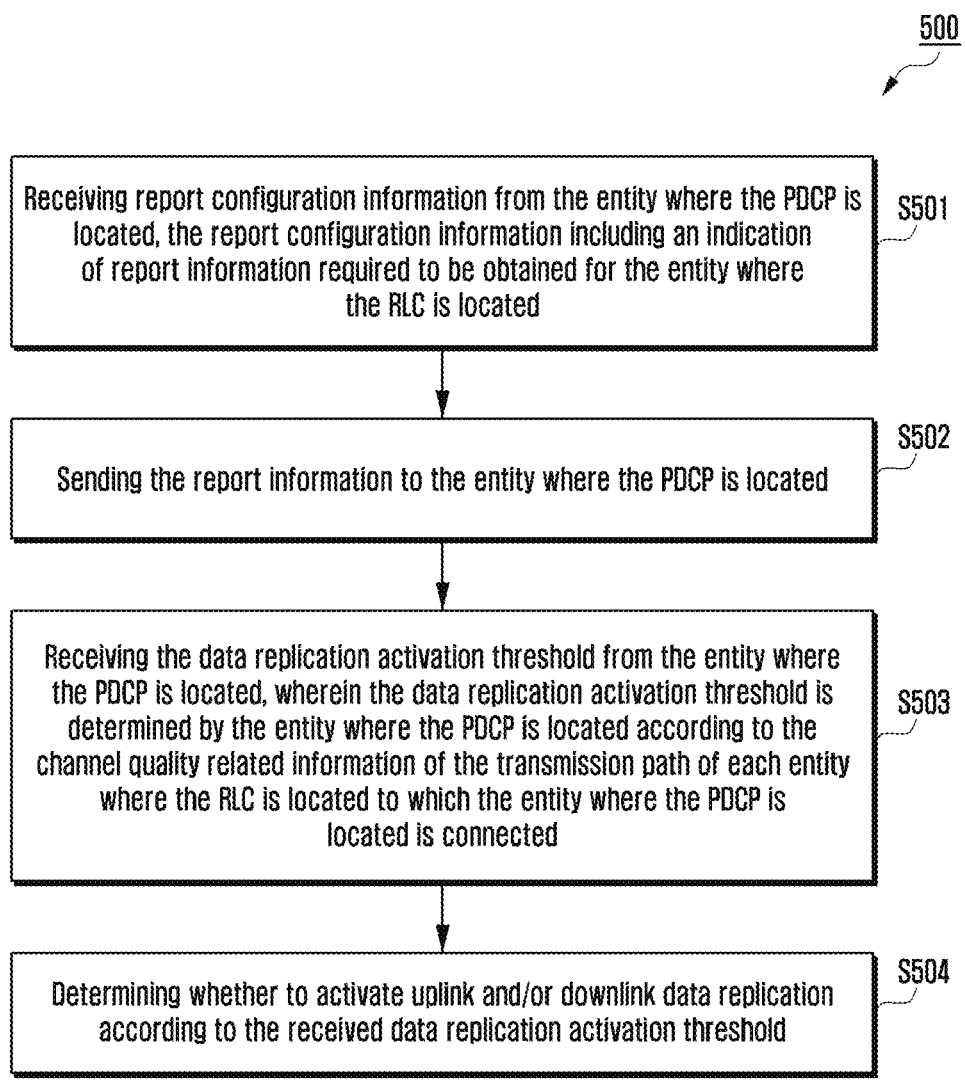
FIG. 5 schematically illustrates a flowchart of a method for data replication performed at an entity where the RLC is located according to an exemplary embodiment of the present disclosure.

FIG. 5 schematically illustrates a flowchart of a method 500 for data replication performed at an entity where the RLC is located according to an exemplary embodiment of the present disclosure.

As shown in FIG. 5, the method 500 includes steps S501 to S504.

In step S501, the entity where the RLC is located may receive report configuration information from the entity where the PDCP is located. As mentioned before, the entity where the PDCP is located may be a master base station, a secondary base station, or a central control node. The report configuration information includes an indication of report information required to be obtained for the entity where the RLC is located.

In step S502, the entity where the RLC is located may send the report information to the entity where the PDCP is located, wherein the report information is used to assist the entity where the PDCP is located to determine activation or deactivation of data replication.

In an exemplary embodiment, the report information may include at least one of:
channel quality related information of the transmission path,
indication information for activation or deactivation of uplink and/or downlink data replication, wherein the indication information is determined by the entity where the RLC is located according to at least channel quality related information of the transmission path and/or the data replication activation threshold.

In an exemplary embodiment, the channel quality related information of the transmission path may include at least one of:
- a measurement value of channel quality,
- a level of channel quality,
- a difference between the measurement value of channel quality and the data replication activation threshold.

In the second exemplary embodiment shown in FIG. 7, which will be described in detail later, the method 500 may include step S503, in which the entity where the RLC is located receives the data replication activation threshold from the entity where the PDCP is located, wherein the data replication activation threshold is determined by the entity where the PDCP is located according to the channel quality related information of the transmission path of each entity where the RLC is located to which the entity where the PDCP is located is connected.

In step S504, the entity where the RLC is located may determine whether to activate uplink and/or downlink data replication according to the received data replication activation threshold.

When the entity where the RLC is located determines to activate the downlink data replication, the entity where the RLC is located sends replicated downlink data to the UE. When the entity where the RLC is located determines to activate uplink data replication, the entity where the RLC is located sets a MAC CE to indicate activation of the uplink data replication, and sends, to the UE, the MAC CE indicating the activation of the uplink data replication.

Figure 8:
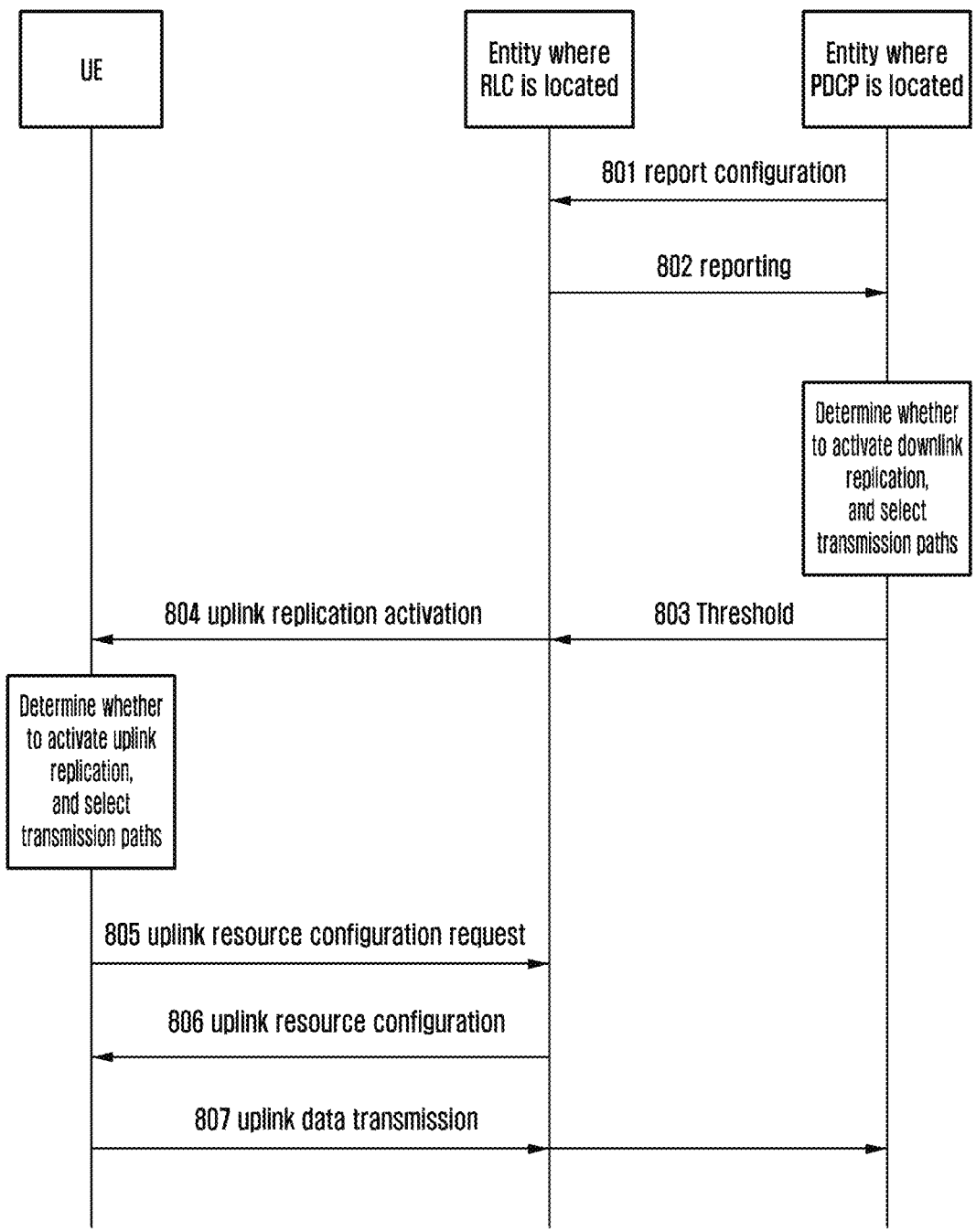
FIG. 8 schematically illustrates a signaling flowchart for data replication and data transmission according to a third exemplary embodiment of the present disclosure.

Alternatively, in the third exemplary embodiment shown in FIG. 8, which will be described in detail later, when the entity where the RLC is located determines to activate the downlink data replication, the entity where the RLC is located sends the downlink data replication activation indication to the entity where the PDCP is located; when the entity where the RLC is located determines to activate the uplink data replication, the entity where the RLC is located sets the MAC CE to indicate activation of the uplink data replication, and sends, to the UE, the MAC CE indicating the activation of the uplink data replication and channel quality related information.

Alternatively, in the first exemplary embodiment shown in FIG. 6, which will be described in detail later, the report configuration information may further include at least one of:
- report trigger condition information; and
- the data replication activation threshold, wherein the data replication activation threshold is determined by the entity where the PDCP is located according to the channel quality related information of the transmission path of each entity where the RLC is located to which the entity where the PDCP is located is connected.

When the entity where the PDCP is located determines to activate the uplink data replication according to the report information, and selects a transmission path connected to the entity where the RLC is located as a transmission path for transmitting replicated uplink data, the method 500 may further include:
- the entity where the RLC is located receiving, from the entity where the PDCP is located, an uplink data replication activation instruction for indicating to transmit the replicated uplink data on the transmission path; according to the received uplink data replication activation instruction, setting the MAC CE to indicate the activation of the uplink data replication; and sending, to the UE, the MAC CE indicating the activation of the uplink data replication.

A signaling flow for data replication and transmission according to the first, second, and third exemplary embodiments of the present disclosure will be described below with reference to FIGS. 6 to 8. FIGS. 6 to 8 schematically show the signaling flow for data replication and transmission according to the first, second and third exemplary embodiments of the present disclosure, respectively. In FIGS. 6 to 8, the entity where the PDCP is located executes the method 400 described with reference to FIG. 4, and the entity where the RLC is located executes the method 500 described with reference to FIG. 5. For details, refer to the foregoing descriptions of FIG. 4 and FIG. 5.

First, a signaling flow according to the first exemplary embodiment of the present disclosure will be described with reference to FIG. 6.

In process 601, the entity where the PDCP is located sends report configuration information to the entity where the RLC is located.

As mentioned above, the entity where the PDCP is located may be the master base station, the secondary base station, or the central control node, and the entity where the RLC is located may be the master base station, the secondary base station, or the distributed entity.

The report configuration information may be sent through a control plane message, such as a message on the Xn interface or a message on the F1 interface, or sent through the user plane, such as the user plane for Xn or F1.

The report configuration information may carry one or more of:
- Indication information, for indicating that the entity where the PDCP is located needs to obtain report information, which is used to assist the entity where the PDCP is located to determine activation or deactivation of PDCP data replication. It should be understood that when the entity where the RLC is located receives the indication information, the entity where the RLC is located may send the report information to the entity where the PDCP is located;
- A report trigger condition, which may be set to be periodic or be triggered by events. If it is a periodic reporting, a reporting period is also included; if it is triggered by events, a trigger threshold is also included. It should be understood that after the entity where the RLC is located receives the trigger condition, the entity where the RLC is located may report the required information according to the report trigger condition;
- A threshold, which sets a threshold for activating the PDCP replication (or sets a threshold for deactivating the PDCP replication). The entity where the RLC is located measures the channel quality, the RLCs are distributed on different entities, and there is only one PDCP connected to each entity where the RLC is located. Therefore, each entity where the RLC is located may report the detected signal quality to the entity where the PDCP is located, for example, through the process 602 described later. The PDCP may obtain channel quality related information of the transmission path of each entity where the RLC is located. The PDCP determines a threshold accordingly, and sends the threshold to each entity where the RLC is located. The same threshold may be set for the uplink and downlink, or different thresholds may be set for the uplink and downlink, or a threshold may be set only for the uplink, or a threshold may be set only for the downlink. For example, the entity where the RLC is located may determine, based on the threshold, a suggestion about whether to activate or deactivate the downlink and/or uplink PDCP data replication, and send the suggestion information or the measurement results to the entity where the PDCP is located. This will be detailed in process 602.

In process 602, the entity where the RLC is located sends report information to the entity where the PDCP is located.

The report information may be sent through messages on the control plane or through the user plane.

The report information may carry one or more of:

Indication information for PDCP data replication deactivation or activation—the entity where the RLC is located may provide a suggestion about whether to activate or deactivate PDCP data replication to the entity where the PDCP is located, according to the threshold and the actually measured channel quality, or according to the measured channel quality only. The indication information for PDCP data replication deactivation or activation may include indication information for uplink and downlink PDCP data replication deactivation or activation, respectively, or may only include indication information for uplink PDCP data replication deactivation or activation, or may only include indication information for downlink PDCP data replication deactivation or activation;

Channel quality related information of the transmission path, which may include at least one of:
  a channel quality measurement value—the entity where the RLC is located may measure the channel quality and report the measurement value to the entity where the PDCP is located. For example, the channel quality measurement value may include at least one of: the average of the channel quality indicator (CQI) measurements, the number of HARQ retransmissions, the downlink channel quality level, the uplink channel quality level;
  a difference between the channel quality measurement value and the threshold—the entity where the RLC is located may measure the channel quality and report the difference between the channel quality measurement value and the threshold to the entity where the PDCP is located. As described above, the threshold may be determined by the entity where the PDCP is located according to the channel quality related information of the transmission path of each entity where the RLC is located to which the entity where the PDCP is located is connected.

In process 603, for downlink data, the entity where the PDCP is located may determine whether to replicate the PDCP data packet, and when it is determined that the PDCP data packet is to be replicated, select the transmission paths through which the replicated PDCP data packets are to be sent. The entity where the PDCP is located may select two of the transmission paths with the best signal quality according to the report information received in the process 602, and then send the replicated downlink data packets to the corresponding base stations or entities through these two transmission paths. The base stations or entities receiving the downlink data packets may send the downlink data packets to the UE according to an existing mechanism.

For uplink data, the entity where the PDCP is located may select two transmission paths with the best signal quality, and then send the uplink data replication activation indication to the entity where the RLC is located of each selected transmission path. The uplink data replication activation indication is used to indicate that the replicated uplink data is to be transmitted on the transmission path. The entity where the RLC is located receives the uplink data replication activation indication, and sets the MAC protocol layer control element (MAC CE) to indicate uplink data "replication activation" according to the uplink data replication activation indication. The indication information may be sent to the entity where the RLC is located through control plane signaling, or sent to the entity where the RLC is located through the user plane, for example, the indication information is carried by the header of the downlink data packet. According to this method, the base station in which the PDCP is located or the central control node in which the PDCP is located may decide whether the uplink PDCP needs to be replicated, and select the two links with the best signal quality to transmit the replicated PDCP data packets, which may avoid the problems that arise when it is up to the MAC to decide.

In process 604, the entity where the RLC is located sends the MAC CE indicating the uplink data replication activation (hereinafter referred to as "indication information") to the UE. After receiving the indication information, the UE replicates the uplink data packet according to the indication information, and sends the replicated uplink data packets on the two transmission paths for which "replication activation" is indicated. For any of other transmission paths, if it was previously in the replication activation state, the entity where the PDCP is located sends an uplink data replication deactivation indication to the entity where the RLC is located on the transmission path, indicating that the uplink data replication needs to be deactivated on the transmission path. The base station or entity receives the uplink data replication deactivation indication, and according to the uplink data replication deactivation indication, sets the MAC CE to indicate that the uplink data is "replication deactivated".

In process 605, the UE sends an uplink resource configuration request command to the entity where the RLC is located. When replication transmission is performed for the PDCP uplink data, the UE is configured with two uplink transmission paths, and the UE sends resource configuration request commands to the MAC layers in which the two paths are located, respectively. For example, the UE sends MAC layer control information (including a buffer status report) to the MAC layer on the entity where the RLC is located.

In process 606, the entity where the RLC is located sends a resource allocation command to the UE. According to the buffer status report, the scheduling function of the entity where the RLC is located allocates the resource configuration for uplink data transmission to the UE, and notifies the UE of the resource configuration information. The UE may then transmit data on the allocated uplink resources.

In process 607, the UE sends replicated uplink data to the entity where the RLC is located on the allocated resources. Each replicated uplink data packet is sent to the entity where the RLC is located through the data transmission path, and the entity where the RLC is located sends the data packet to the entity where the PDCP is located through the tunnel. The reception function of the PDCP detects replicated data packets and determines whether there are duplicate receptions. If there are duplicate receptions, the duplicate data packets are discarded.

Hereinafter, a signaling flow according to a second exemplary embodiment of the present disclosure will be described with reference to FIG. 7.

In process 701, the entity where the PDCP is located sends report configuration information to the entity where the RLC is located.

As mentioned above, the entity where the PDCP is located may be the master base station, the secondary base station, or the central control node, and the entity where the RLC is located may be the master base station, the secondary base station, or the distributed entity.

The report configuration information may be sent through messages on the control plane or through the user plane.

The report configuration information may carry one or more of:

Indication information, for indicating that the entity where the PDCP is located needs to obtain report information, which is used to assist the entity where the PDCP is located to determine activation or deactivation of downlink PDCP data replication. It should be understood that when the entity where the RLC is located receives the indication information, the entity where the RLC is located may send the report information to the entity where the PDCP is located;

A report trigger condition, which may be set to be periodic or be triggered by events. If it is a periodic reporting, a reporting period is also included; if it is triggered by events, a trigger threshold is also included. It should be understood that after the entity where the RLC is located receives the trigger condition, the entity where the RLC is located may report the required information according to the report trigger condition.

In process 702, the entity where the RLC is located sends report information to the entity where the PDCP is located.

The report information may be sent through messages on the control plane or through the user plane.

The report information may carry one or more of:

Channel quality related information of the transmission path, which may include at least one of:
 a channel quality measurement value—the entity where the RLC is located may measure the channel quality and report the measurement value to the entity where the PDCP is located. For example, the channel quality measurement value may include at least one of: the average of the CQI measurements, the number of HARQ retransmissions, the downlink channel quality level, the uplink channel quality level, or other measurement values that reflect the channel quality.

In process 703, the entity where the PDCP is located may send the threshold to the entity where the RLC is located. As mentioned above, the threshold may be determined by the entity where the PDCP is located according to the channel quality related information of the transmission path of each entity where the RLC is located to which the entity where the PDCP is located is connected.

Alternatively, the entity where the PDCP is located may also send, through process 701, the threshold and other information as the report configuration information to the entity where the RLC is located.

This threshold sets a threshold for activating PDCP replication (or sets a threshold for deactivating PDCP replication). The entity where the RLC is located measures the channel quality, the RLCs are distributed on different entities, and there is only one PDCP connected to each entity where the RLC is located. Therefore, each entity where the RLC is located may report the detected signal quality to the entity where the PDCP is located, for example, through the process 702. The PDCP may obtain channel quality of the transmission path of each entity where the RLC is located. The PDCP determines a threshold accordingly, and sends the threshold to each entity where the RLC is located. The same threshold may be set for the uplink and downlink, or different thresholds may be set for the uplink and downlink, or a threshold may be set only for the uplink, or a threshold may be set only for the downlink.

The entity where the PDCP is located determines that the downlink data packet needs to be replicated, but is not sure which two paths are used to send the downlink data packet. PDCP replicates the downlink data packet into multiple replications and sends the replicated data to each entity where the RLC is located. The entity where the RLC is located determines, according to the threshold, whether to send a replicated downlink PDCP data packet that has been received. For example, if the channel quality measured by the entity where the RLC is located is higher than the threshold, the replicated PDCP data packet is sent to the UE. If two tunnels are established between an entity where the RLC is located and an entity where the PDCP is located, the RLC needs to determine, according to the threshold, whether to send on both transmission paths or select one path to send. If it is determined not to send, the RLC discards the received data packet.

For uplink data, the entity where the RLC is located determines whether to perform replication, and proceeds to process 704. If the entity where the RLC is located determines, according to the threshold, that the replication of the uplink data needs to be activated on the path, the MAC layer of the entity where the RLC is located sets the MAC CE to indicate "replication activation". The MAC CE is sent to the UE by the base station or entity where the MAC is located. After receiving the indication information, the UE replicates the uplink data packet according to the indication information, and sends the replicated uplink data packets on the transmission paths for which "replication activation" is indicated. If the channel quality measured by the entity where the RLC is located is lower than the threshold, the entity where the RLC is located determines that PDCP data replication needs to be deactivated on the path, and the MAC CE indicates "replication deactivation". The MAC CE is sent to the UE by the base station or entity where the MAC is located. After receiving the indication information, the UE does not perform data replication or does not send data on the transmission path.

In process 705, the UE sends an uplink resource configuration request command to the entity where the RLC is located. When replication transmission is performed for the PDCP uplink data, the UE will receive "replication activation" from two or more paths. At this time, the UE selects two transmission paths, and the UE sends resource configuration request commands to the MAC layers in which the two paths are located, respectively. For example, the UE sends MAC layer control information (including a buffer status report) to the MAC layer on the entity where the RLC is located.

In process 706, the entity where the RLC is located sends a resource allocation command to the UE. According to the buffer status report, the scheduling function of the entity where the RLC is located allocates the resource configuration for uplink data transmission to the UE, and notifies the UE of the resource configuration information. The UE may then transmit data on the allocated uplink resources.

In process 707, the UE sends replicated uplink data to the entity where the RLC is located on the allocated resources. The replicated data packets are sent to the entities in which the RLCs are located through the data transmission paths. The entities in which the RLCs are located send the data packets to the entity where the PDCP is located through the tunnels. The reception function of the PDCP detects replicated data packets and determines whether there are duplicate receptions. If there are duplicate receptions, the duplicate data packets are discarded.

Hereinafter, a signaling flow according to a third exemplary embodiment of the present disclosure will be described with reference to FIG. 8. FIG. 8 describes the process of activating or deactivating uplink data replication. The process of activating or deactivating downlink data replication may use the method shown in FIG. 6 or FIG. 7.

In process 801, the entity where the PDCP is located sends report configuration information to the entity where the RLC is located.

As mentioned above, the entity where the PDCP is located may be the master base station, the secondary base station, or the central control node, and the entity where the RLC is located may be the master base station, the secondary base station, or the distributed entity.

The report configuration information may be sent through messages on the control plane or through the user plane.

The report configuration information may carry one or more of:

Indication information, for indicating that the entity where the PDCP is located needs to obtain report information, which is used to assist the entity where the PDCP is located to determine activation or deactivation of PDCP data replication. It should be understood that when the entity where the RLC is located receives the indication information, the entity where the RLC is located may send the report information to the entity where the PDCP is located;

A report trigger condition, which may be set to be periodic or be triggered by events. If it is a periodic reporting, a reporting period is also included; if it is triggered by events, a trigger threshold is also included. It should be understood that after the entity where the RLC is located receives the trigger condition, the entity where the RLC is located may report the required information according to the report trigger condition.

In process 802, the entity where the RLC is located sends report information to the entity where the PDCP is located.

The report information may be sent through messages on the control plane or through the user plane.

The report information may carry one or more of:

Indication information for PDCP data replication deactivation or activation—the entity where the RLC is located may provide a suggestion about whether to activate or deactivate PDCP data replication to the entity where the PDCP is located, according to the actually measured channel quality. The indication information for PDCP data replication deactivation or activation may include indication information for uplink and downlink PDCP data replication deactivation or activation, respectively, or may only include indication information for uplink PDCP data replication deactivation or activation, or may only include indication information for downlink PDCP data replication deactivation or activation;

Channel quality related information of the transmission path, which may include at least one of:

a channel quality measurement value—the entity where the RLC is located may measure the channel quality and report the measurement value to the entity where the PDCP is located. For example, the channel quality measurement value may include at least one of: the average of the CQI measurements, number of HARQ retransmissions, downlink channel quality level, uplink channel quality level;

a difference between the channel quality measurement value and the threshold—the entity where the RLC is located may measure the channel quality and report the difference between the channel quality measurement value and the threshold to the entity where the PDCP is located. As described above, the threshold may be determined by the entity where the PDCP is located according to the channel quality related information of the transmission path of each entity where the RLC is located to which the entity where the PDCP is located is connected.

In process 803, the entity where the PDCP is located sends the threshold to the entity where the RLC is located. As mentioned above, the threshold may be determined by the entity where the PDCP is located according to the channel quality related information of the transmission path of each entity where the RLC is located to which the entity where the PDCP is located is connected.

Alternatively, the entity where the PDCP is located may also send, through process 801, the threshold and other information as the report configuration information to the entity where the RLC is located.

This threshold sets a threshold for activating PDCP replication (or sets a threshold for deactivating PDCP replication).The entity where the RLC is located measures the channel quality, the RLCs are distributed on different entities, and there is only one PDCP connected to each entity where the RLC is located. Therefore, each entity where the RLC is located may report the detected signal quality to the entity where the PDCP is located, for example, through the process 802. The PDCP may obtain channel quality of the transmission path of each entity where the RLC is located. The PDCP determines a threshold accordingly, and sends the threshold to each entity where the RLC is located.

The entity where the RLC is located may determine whether to activate or deactivate uplink PDCP data replication according to the threshold. For example, if the channel quality measured by the entity where the RLC is located is higher than the threshold, the PDCP data replication is activated.

For uplink data, if the RLC entity determines to activate uplink replication or deactivate uplink replication, the MAC layer on the RLC entity sets the MAC CE to indicate "replication activation" or "replication deactivation", and proceeds to process 804, where the MAC CE is sent by the base station or entity where the MAC is located to the UE. In addition to the indication information for "replication activation" or "replication deactivation", it is also necessary to inform the UE of the measured channel quality related information, such as the difference between the measured channel quality measurement value and the threshold, or the measured channel quality level, and the like. After receiving the indication information for "replication activation" or "replication deactivation", the UE determines whether to replicate the uplink data packet according to the indication information and channel quality related information, and determines on which two transmission paths the data packet is transmitted.

In process 805, the UE sends an uplink resource configuration request command to the entity where the RLC is located. After the UE selects two (or more) transmission paths, the UE sends resource configuration request commands to the MAC layers in which the two paths are located, respectively. For example, the UE sends MAC layer control information (including a buffer status report) to the MAC layer on the entity where the RLC is located.

In process 806, the entity where the RLC is located sends a resource allocation command to the UE. According to the buffer status report, the scheduling function of the entity where the RLC is located allocates the resource configuration for uplink data transmission to the UE, and notifies the UE of the resource configuration information. The UE may then transmit data on the allocated uplink resources.

In process 807, the UE sends replicated uplink data to the entity where the RLC is located on the allocated resources. The replicated data packets are sent to the entities in which the RLCs are located through the data transmission paths. The entities in which the RLCs are located send the data packets to the entity where the PDCP is located through the tunnels. The reception function of the PDCP detects replicated data packets and determines whether there are duplicate receptions. If there are duplicate receptions, the duplicate data packets are discarded.

Hereinafter, a method for data counting performed at the entity where the RLC is located according to an exemplary embodiment of the present disclosure will be described in detail with reference to FIG. 9.

Figure 9:
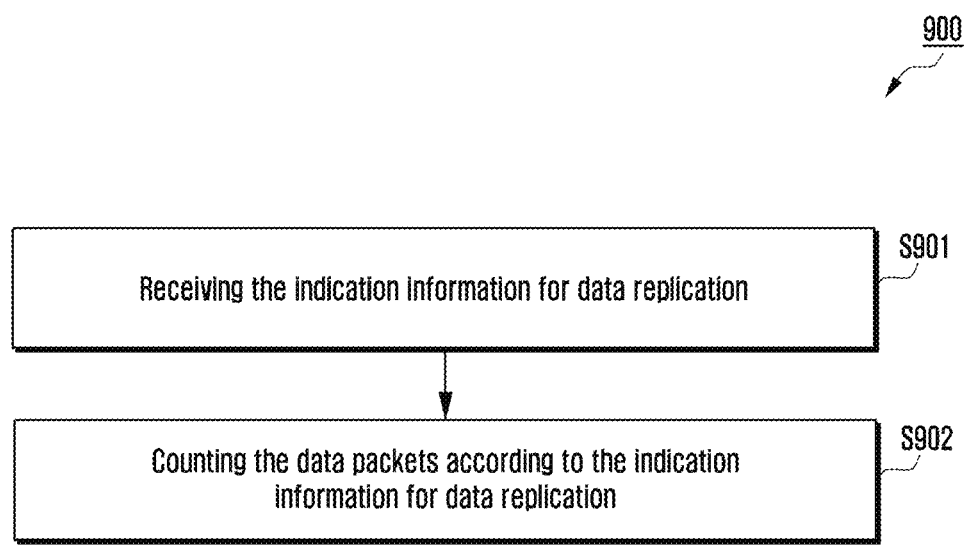
FIG. 9 schematically illustrates a flowchart of a method for data counting performed at an entity where RLC is located according to an exemplary embodiment of the present disclosure.

FIG. 9 schematically illustrates a flowchart of a method 900 for data counting performed at an entity where the RLC is located according to an exemplary embodiment of the present disclosure. As mentioned above, the entity where the RLC is located may be a master base station, a secondary base station, or a distributed entity.

As shown in FIG. 9, the method 900 includes steps S901 and S902.

In step S901, the entity where the RLC is located receives the indication information for data replication; and in step S902, the entity where the RLC is located counts the data packets according to the indication information for data replication.

Figure 10:
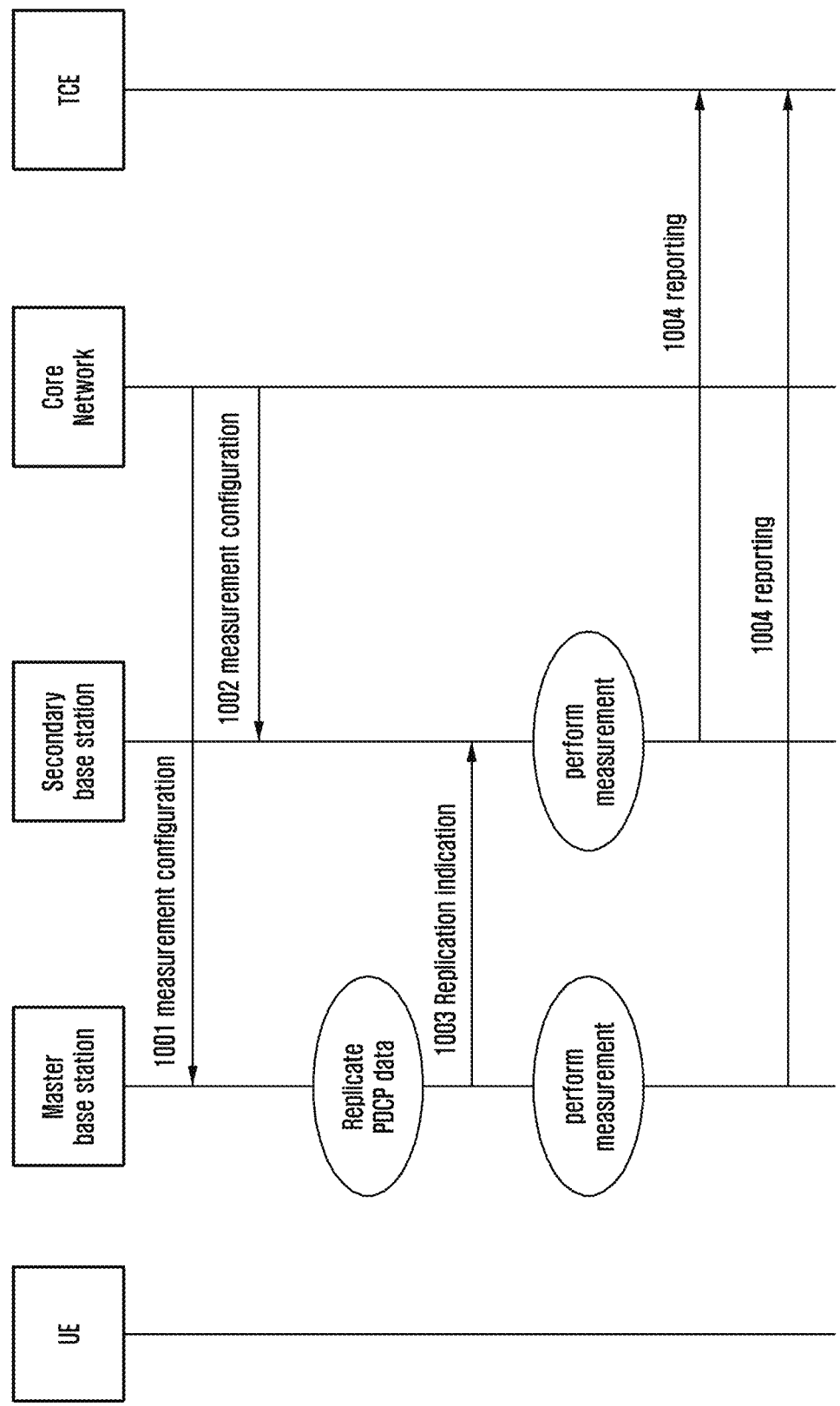
FIG. 10 schematically illustrates a signaling flowchart for data counting according to an exemplary embodiment of the present disclosure.

FIG. 10 schematically illustrates a signaling flow for data counting according to an exemplary embodiment of the present disclosure, which describes that when PDCP replication is activated, the access network node needs to perform a minimum drive test (MDT) measurement on the UE, or the access network node needs to count data traffic or data throughput of the UE. At present, counting may only be made on both copies of the data. In this case, from the perspective of the business level, the business level only needs to send one copy of the data, while the counting are performed on the two copies of the data, so the result of the counting cannot reflect the true amount of data at the business level. Therefore, this embodiment describes how to count only one copy of data. In this embodiment, the core network node is an access and mobility management function (AMF) in the 5G system, or the core network node may be a Mobile management entity (MME) in the LTE system, or a core network entity in another system. The access network node may be a base station in the 5G system, or a base station in the LTE system, or a base station in another system. The interface between the core network node and the access network node is the NG interface in the 5G system and the S1 interface in the LTE system. The interface between the access network node and the access network node is the Xn interface in the 5G system and the X2 interface in the LTE system.

In this embodiment, the UE has established a dual connectivity. The UE has a master base station and a secondary base station. It is not excluded that the UE has a plurality of secondary base stations, but there are only two base stations transmitting data at the same time. The master base station and the secondary base station serve the UE together. The core network node configures the access network for MDT measurement. FIG. 10 uses the case where PDCP is established on the master base station as an example. However, PDCP may also be established on the secondary base station. Only by modifying the messages can it be applied to the case where PDCP is established on the secondary base station.

Specifically, FIG. 10 may include the following processes.

Process 1001: the core network node sends a measurement configuration to the master base station.

In this process, the core network node may also be replaced with an operation and maintenance node, such as the operation and maintenance node EM (Element Management). If the access network control node receives the message of the process 1001 from the operation and maintenance node, the access network control node needs to select the UE for MDT measurement. When the access network control node selects the UE, the following factors need to be considered: whether the user agrees, whether the user is within the range of the MDT measurement. If the core network node sends the message of the process 1001, the core network has selected the UE, and the message of the process 1001 is sent to the master base station through the UE-specific signaling.

The measurement configuration contains one or more of the following information:
  An MDT measurement ID. This ID uniquely identifies a certain MDT measurement process.
  An IP address of the measurement center node (for example, TCE). The measurement center node is the entity that receives the measurement report.
  A measurement mode. Specifically, it refers to which measurement is performed on the UE by the access network, that is, the measurement type. For example, the measurement type may be data delay measurement, data traffic measurement, data throughput measurement, CU-CP delay measurement, F1 delay measurement, DU delay measurement. Alternatively, the measurement mode is another mode.
  A report configuration, including a reporting period, a reporting threshold, and the like.
  A measurement range. The measurement range may be a set of cells, or a set of routing areas TA, or the entire PLMN range.

Process 1002: the master base station sends configuration information to the secondary base station.

The master base station determines which node performs the MDT measurement according to the measurement configuration of the process 1001. Generally, the measurement of MDT is for one DRB. If the DRB is only established on the master base station, the master base station measures and reports; if the DRB is only established on the secondary base station, the master base station sends the MDT configuration information to the secondary base station and the secondary base station measures and reports; if the data of a DRB is transmitted through the master base station and the secondary base station at the same time, the measurement should be performed on both the master base station and the secondary base station.

The configuration information carried in the message of the process 1002 includes one or more of:
  An MDT measurement ID. This ID uniquely identifies a certain MDT measurement process.
  An IP address of the measurement center node (for example, TCE). The measurement center node is the entity that receives the measurement report.
  A measurement mode. Specifically, it refers to which measurement is performed on the UE by the access network, that is, the measurement type. The measurement mode here may be the same as or different from the measurement mode included in the process 1001. For example, the measurement type may be data delay measurement, data traffic measurement, data throughput measurement, CU-CP delay measurement, F1 delay measurement, DU delay measurement. Alternatively, the measurement mode is another mode.

A report configuration, including a reporting period, a reporting threshold, and the like.

A measurement range. The measurement range may be a set of cells, or a set of routing areas TA, or the entire PLMN range.

A configuration of where the measurement results are sent to. The configuration information indicates to which entity the access network node should send the MDT measurement results. For example, the measurement results may be configured to be sent to another access network entity or to the MDT center entity TCE. The configuration may be performed by setting the identity or IP address of the destination node for the measurement report.

A configuration of whether the measurement results are reported to the MDT center entity. The configuration information indicates whether the access network node reports the measurement results to the MDT center entity TCE. The configuration information may also be indicated by the IP address of the measurement center node (such as TCE).

Process 1003: the master base station performs PDCP data replication, and sends the indication information for data replication to the secondary base station.

The indication information for data replication may be sent through a message on the control plane. The message carries the ID of the DRB and indications for the start of replication (replication activation) or the end of replication (replication deactivation). Alternatively, the indication information for data replication may be sent through a data packet on the user plane. For example, a bit of indication information may be carried in the data packet header, which indicates whether the data carried in the data packet is replicated data, or whether the data packet is replicated data or non-replicated data.

It should be noted that if the PDCP is established on the secondary base station, when the PDCP performs replication activation, the secondary base station sends the indication information for data replication to the master base station.

With reference to the method 900 described in FIG. 9, the secondary base station receives the indication information for data replication of the process 1003. When the secondary base station performs MDT measurement, only the non-replicated data packets are considered, and the replicated data packets are not counted. The master base station counts the replicated data packets, so that the problem of the replicated data packets being counted twice does not occur. Specifically, if the secondary base station receives the message of the process 1003, which carries indication information indicating that data packet replication starts, the secondary base station does not count the data packets of the DRB sent by the master base station in the MDT measurement, until the secondary base station receives from the master base station a message indicating the end of the data packet replication. At this time, the secondary base station begins to count the data packets of the DRB sent by the master base station in the MDT measurement. Alternatively, the secondary base station receives the indication information of the process 1003 on the user plane. If the data packet is indicated as a replicated data packet, the secondary base station does not take the data packet into account when performing the MDT measurement. If the data packet is indicated as a non-replicated data packet, the secondary base station takes the data packet into account.

Process 1004: The base station sends the measurement results to the TCE.

According to the measurement configuration, if both the master base station and the secondary base station perform MDT measurement, the master base station and the secondary base station respectively send a measurement report to the TCE. The measurement report includes the identification of the MDT measurement and the corresponding measurement results. According to the identification of the MDT measurement, the TCE may combine the information reported by the master base station and the secondary base station.

Alternatively, according to the configuration information of the process 1002, the secondary base station sends the measurement results to the master base station, and the master base station combines, and then sends the measurement results to the TCE.

Figure 14:
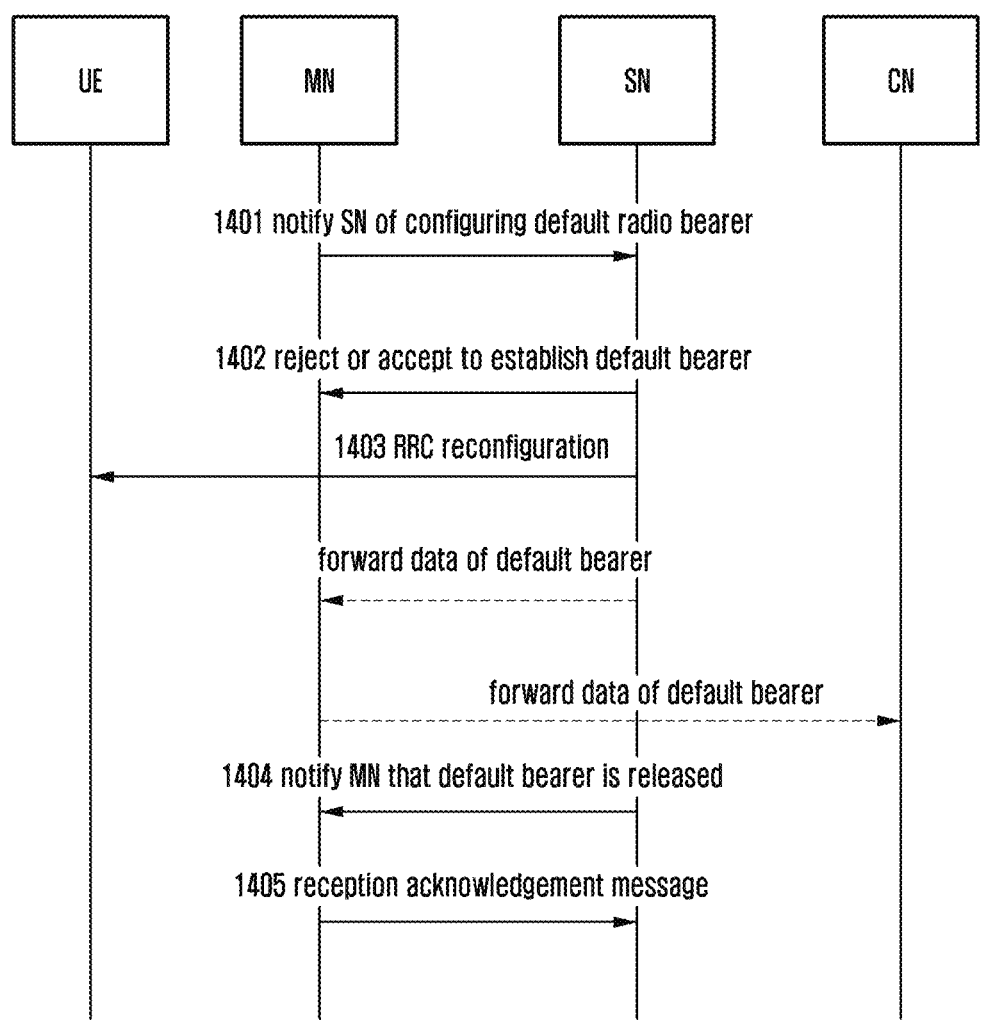
FIG. 14 schematically illustrates a signaling flowchart for establishing a default radio data bearer on a secondary base station according to a fourth exemplary embodiment of the present disclosure.

FIG. 14 schematically illustrates a signaling flowchart for establishing a default radio data bearer on a secondary base station according to a fourth exemplary embodiment of the present disclosure.

A data packet session (PDU session) contains a plurality of data streams (QoS flows). Some QoS flows are established on the master base station MN. These QoS flows may be mapped to one or more radio data bearers (DRBs) and the data convergence control protocols (PDCP protocols) of the corresponding radio data bearers are established on the MN. These bearers are also known as the MN terminated bearers. A tunnel is established between the MN and the core network CN for these bearers belonging to the same PDU session, which is used to transmit uplink and downlink data. Other QoS flows are established on the SN. These QoS flows may be mapped to one or more radio data bearers. The PDCP protocols of the corresponding radio data bearers are established on the SN. These bearers are also known as the SN terminated bearers. A tunnel is established between the SN and the core network CN for these bearers belonging to the same PDU session, which is used to transmit uplink and downlink data. A PDU session may establish a default radio data bearer. The default radio data bearer is configured on the UE by the MN or SN. When the UE has uplink data packets to send, for example, a certain data stream has uplink data to send, and the core network and the base station have not configured the mapping relationship between the data stream and the uplink data bearer, that is, there is no corresponding RRC configuration, and/or there is no reflective mapping rule which is configured by the core network on the UE, then the data packet should be sent on the default radio data bearer. FIG. 14 describes the process by which the default radio data bearer is established on the SN.

Step 1401: the master base station sends a secondary base station establishment request or a secondary base station modification request message to the secondary base station.

The master base station MN determines to configure the default radio data bearer by the secondary base station SN. The MN determines which QoS flows need to be established on the SN. Similarly, the MN determines whether to configure the default radio data bearer by the secondary base station SN. The MN may determine it according to (but not limited to) the following situations:

The MN determines that all QoS flows of a PDU session are established on the SN, which means that the radio data bearers corresponding to these QoS flows are SN terminated bearers, and the corresponding PDCP protocols are on the SN. Then the MN may determine to configure the default radio data bearer by the SN.

The MN determines that all Non-GBR QoS flows of a PDU session are established on the SN, which means that the radio data bearers corresponding to these QoS flows are SN terminated bearers, and the corresponding PDCP protocols are on the SN. Then the MN may determine to configure the default radio data bearer by the SN.

The MN determines that all QoS flows with reflective attributes are established on the SN, which means that the radio data bearers corresponding to these QoS flows are SN terminated bearers, and the corresponding PDCP protocols are on the SN. Then the MN may determine to configure the default radio data bearer by the SN.

The MN determines which QoS flows are established on the SN. The MN also determines to configure the default radio bearer by the SN. The two determinations are not directly related.

The secondary base station establishment request or secondary base station modification request message sent by the master base station includes one or more of the following information:

Information of the QoS flow established on the SN, which includes the identifier of the QoS flow, the quality configuration information of the QoS flow, and so on.

Identifications of the DRB available to the SN terminated bearer.

Indication information indicating the SN to configure the default DRB bearer. The indication information indicates that the SN needs to configure the default radio data bearer.

The identification of the default DRB bearer configured by the MN. Including this identification means that the SN needs to use the DRB identification to configure the default radio data bearer. By indicating the identification, the MN determines the identification of the default radio data bearer. The default DRB bearer identification may be within the scope of the identifications of the DRB available to the SN terminated bearer, or it may be a separate identification that is not within the scope of the identifications of the DRB available to the SN terminated bearer.

Implicit indication indicating that the SN needs to configure the default DRB bearer. For example, if it is set in the quality information of the QoS flow that the QoS flow has the reflective attribute, it means that the SN needs to configure the default DRB.

Step 1402: the secondary base station sends a secondary base station establishment response or secondary base station modification response message to the master base station.

The secondary base station establishes a SN terminated bearer, and configures the default radio data bearer according to the information in step 1401. The response message contains one or more of the following information:

Indication information of the establishment of the default radio data bearer, which indicates that the SN has established the default radio data bearer. Containing only such information, the MN may know that the SN has established the default radio data bearer, but does not know which DRB is the default radio data bearer.

Indication information of the establishment of the default radio data bearer and the identification of the radio data bearer (DRB ID) that has been successfully established. Through the DRB ID and the default radio data bearer, the MN may know which DRB is the default radio data bearer.

Identification of the default radio data bearer. By the identification of the default radio data bearer, the MN may know which DRB is the default radio data bearer.

The subsequent steps are the same as the existing secondary base station establishment or secondary base station modification process. The MN or SN sends an RRC reconfiguration request message to the UE, and the UE sends an RRC reconfiguration response message to the MN. The MN sends a PDU Session resource modification indication message to the core network. This message notifies the core network of the tunnel and the identifiers of the corresponding QoS flows. The tunnel and the identifiers of the corresponding QoS flows indicate that these QoS flows are to be transmitted through the tunnel. Specifically, the message includes the information of the tunnel established between the core network and the MN and the identifiers of the QoS flows corresponding to the tunnel, and the information of the tunnel established between the core network and the SN and the identifiers of the QoS flows corresponding to the tunnel.

Afterwards, if the UE has uplink data packets to send and the data stream (QoS flow) has no corresponding RRC configuration, or/and no reflective mapping rule, the data packet should be sent from the default radio data bearer. Assume that the MN has not previously established the QoS flow on the SN, that is, the PDU Session Resource Modification Indication message sent by the MN to the core network indicates that the QoS flow corresponds to the tunnel between the core network and the MN and is sent through the tunnel. However, the default radio data bearer is established on the SN, and according to regulations, data packets with no RRC configuration and no reflective mapping rule must be sent through the default radio data bearer. Therefore, the UE uses the default radio data bearer to send the data packet of the QoS flow, and the SN receives the data packet. However, the QoS flow is not established on the SN. In this case, if the SN sends the data packet directly to the core network, this is inconsistent with the tunnel and the identifiers of the corresponding QoS flows notified in the PDU Session resource modification indication message. In this case, there are several methods to transmit the data packet to the core network:

1) In the SN establishment request or SN modification request message, the MN contains information of the uplink tunnel allocated by the MN, including the MN's IP address and/or the identifier of the tunnel. That is, the message in step 1401 contains information of the uplink tunnel allocated by the MN and used to transmit uplink data packets on the default radio data bearer. For the SN terminated bearer, at present, the MN does not need to allocate information of the uplink tunnel. However, for the embodiment of the present disclosure, in order to solve the problem caused by the default radio data bearer established on the SN, the MN needs to allocate in advance an uplink tunnel for the default radio data bearer established on the SN, to receive data from the SN and send it to the core network. Specifically, if the SN receives the uplink data packet of the QoS flow from the default radio data bearer, and there is no information about the QoS flow on the SN, then the SN sends the data packet to the MN. If the SN receives the uplink data packet from the default radio data bearer, and the PDCP protocol corresponding to the default radio data bearer reads the header of the uplink data packet and finds that the identifier of the QoS flow contained in the header is not established on the SN, then the SN sends this data packet (PDCP data packet) to the MN on the uplink tunnel allocated by the MN.

2) The SN sends a new request message to the MN to inform the MN that the SN has received an uplink data packet with no configured QoS flow. The message may also contain the identifier of the default radio data bearer and the identifier of the QoS flow, that is, the identifier of the QoS flow that is received on the default radio data bearer but not configured on the SN. The MN sends a response message to the SN. The message carries the information of the uplink tunnel allocated by the MN for the default radio data bearer, including the MN's IP address and/or the identifier of the tunnel. Then the SN sends to the MN the data packet (PDCP data packet) of the Qos flow on the uplink tunnel allocated by the MN, which is sent to the core network CN by the MN.

3) The SN does not process the data packet and directly sends the data packet to the core network CN. The core network CN receives the data packet, ignores the tunnel and the identifiers of the corresponding QoS flows included in the PDU Session resource modification indication message, and processes the data packet.

When the resources on the SN change and the SN wants to release the default radio data bearer or move the corresponding QoS flows on the default radio data bearer to the MN, the SN sends to the MN a secondary base station modification requirement message, which informs the MN that the default radio data bearer is to be released. The MN may decide, according to its own situation, that the MN is to establish the default radio data bearer, and send the information of the new default radio data bearer to the UE. The following procedure describes the changes in the default radio bearer on the SN.

Step 1404: the secondary base station sends a secondary base station modification requirement message to the master base station.

When the resources change on the SN, the SN needs to release the default radio data bearer. Alternatively, due to the resource change, the SN needs to move a QoS flow corresponding to the default radio data bearer to the MN, so that the default radio bearer also needs to be modified.

The secondary base station modification requirement message contains one or more of the following information:
Indication information of the release of the default radio data bearer, which indicates that the SN needs to release the default radio data bearer that has been established. After receiving the message, the MN may decide whether the MN needs to establish a new default radio data bearer. The MN may send an RRC reconfiguration request message to the UE, and receive an RRC reconfiguration response message of the UE.
Identifier of the radio data bearer (DRB ID) to be released and the indication information of the default radio data bearer. By the DRB ID to be released and the default radio data bearer, the MN may know whether the DRB to be released is the default radio data bearer. If so, the MN may decide whether the MN needs to establish a new default radio data bearer. The MN may send an RRC reconfiguration request message to the UE, and receive an RRC reconfiguration response message of the UE.
Release of the whole PDU Session. The message contains the identifier of the released PDU session, which means that the MN may configure the default radio data bearer.
Identifier of the QoS flow to be released, or identifier of the DRB to be released. The QoS flow or the QoS flow on the DRB has a reflective attribute, which means that the SN releases the default radio data bearer, and that the MN may configured the default DRB.

Step 1405: The master base station sends a secondary base station modification confirmation message. The message confirms that the modification of the secondary base station is successful.

Figure 11:
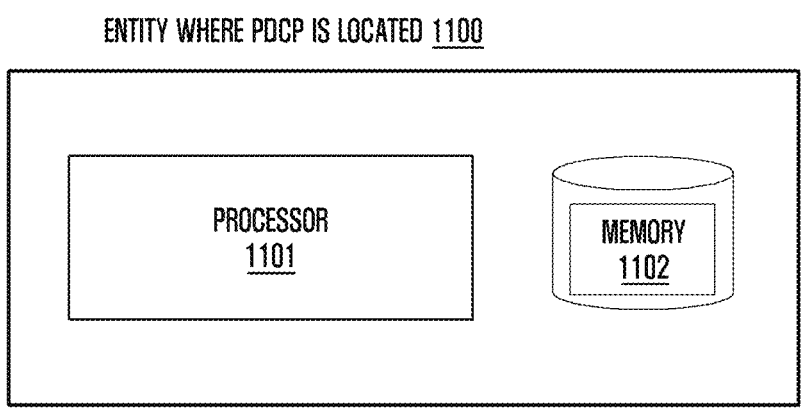
FIG. 11 schematically illustrates a structural block diagram of an entity where PDCP is located according to an exemplary embodiment of the present disclosure.

The structure of the entity where the PDCP is located according to an exemplary embodiment of the present disclosure will be described below with reference to FIG. 11. FIG. 11 schematically illustrates a structural block diagram of an entity 1100 in which the PDCP is located according to an exemplary embodiment of the present disclosure. The entity 1100 in which the PDCP is located may be configured to perform the method 400 as described previously with reference to FIG. 4.

As shown in FIG. 11, the entity 1100 in which the PDCP is located includes a processing unit or a processor 1101. The processor 1101 may be a single unit or a combination of multiple units for performing different steps of the method. The entity 1100 also includes a memory 1102, which stores computer executable indications that, when executed by the processor 1101, cause the entity 1100 in which the PDCP is located to execute the method 400. For brevity, only the schematic structure of a base station according to an exemplary embodiment of the present disclosure is described herein, and details that have been detailed in the method 400 described previously with reference to FIG. 4 are omitted.

When the instructions are executed by the processor 1101, the entity 1100 in which the PDCP is located performs the following operations: sending, to the entity where the radio link control RLC is located, report configuration information which includes an indication of the report information required to be obtained for the entity where the RLC is located; receiving, from the entity where the RLC is located, the report information which is used to assist the entity where the PDCP is located to determine activation or deactivation of data replication; and sending a data replication activation indication to the entity where the RLC is located.

In an exemplary embodiment, the report information includes at least one of:
channel quality related information of the transmission path,
indication information for activation or deactivation of uplink and/or downlink data replication, wherein the indication information is determined by the entity where the RLC is located at least according to channel quality related information of the transmission path and/or a data replication activation threshold.

In an exemplary embodiment, the channel quality related information of the transmission path includes at least one of:
a measurement value of channel quality,
a level of channel quality,
a difference between the measurement value of channel quality and the data replication activation threshold.

In an exemplary embodiment, the report configuration information further includes at least one of:
report trigger condition information; and
the data replication activation threshold, where the data replication activation threshold is determined by the entity where the PDCP is located according to the channel quality related information of the transmission path of each entity where the RLC is located to which the entity where the PDCP is located is connected.

In an exemplary embodiment, when the instructions are executed by the processor 1101, the entity 1100 in which the PDCP is located is further caused to perform the following operations: determining whether to activate the downlink data replication according to the received report information, and if it is determined that downlink data replication is to be activated, selecting at least two transmission paths for transmitting replicated downlink data.

In an exemplary embodiment, when the instructions are executed by the processor 1101, the entity 1100 in which the PDCP is located is further caused to perform the following operations: determining whether to activate the uplink data replication according to the received report information, and if it is determined that uplink data replication is to be activated, selecting at least two transmission paths for transmitting replicated uplink data; and sending an uplink data replication activation indication to the entity where the RLC is located of each of the selected at least two transmission paths to indicate that replicated uplink data is to be transmitted on the transmission path.

In an exemplary embodiment, when the instructions are executed by the processor 1101, the entity 1100 in which the PDCP is located is further caused to perform the following operation: sending a data replication activation threshold to the entity where the RLC is located, so that the entity where the RLC is located determines whether to activate uplink and/or downlink data replication according to the data replication activation threshold; and sending an MAC CE indicating the activation of uplink data replication and signal quality related information to the UE when the entity where the RLC is located determines to activate uplink data replication, wherein the data replication activation threshold is determined by the entity where the PDCP is located according to the channel quality related information of the transmission path of each entity where the RLC is located to which the entity where the PDCP is located is connected.

In an exemplary embodiment, when the instructions are executed by the processor 1101, the entity 1100 in which the PDCP is located is further caused to perform the following operation: receiving a downlink data replication activation indication from the entity where the RLC is located.

As mentioned above, the entity 1100 in which the PDCP is located may be: a master base station, a secondary base station, or a center control node.

Figure 12:
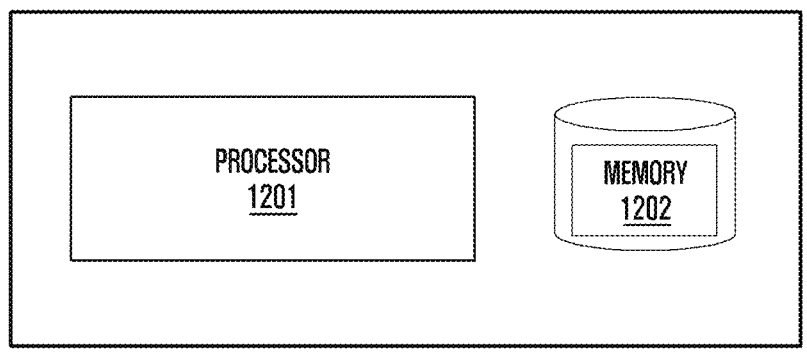
FIG. 12 schematically illustrates a structural block diagram of an entity where RLC is located according to an exemplary embodiment of the present disclosure.

The structure of the entity where the RLC is located according to an exemplary embodiment of the present disclosure will be described below with reference to FIG. 12. FIG. 12 schematically illustrates a structural block diagram of an entity 1200 in which the RLC is located according to an exemplary embodiment of the present disclosure. The entity 1000 in which the RLC is located may be configured to perform the method 500 as described previously with reference to FIG. 5.

As shown in FIG. 12, the entity 1200 in which the RLC is located includes a processing unit or a processor 1201. The processor 1201 may be a single unit or a combination of multiple units for performing different steps of the method. The entity 1200 also includes a memory 1102, which stores computer executable indications that, when executed by the processor 1101, cause the entity 1200 in which the RLC is located to execute the method 500 or the method 900. For brevity, only the schematic structure of a base station according to an exemplary embodiment of the present disclosure is described herein, and details that have been detailed in the method 500 described previously with reference to FIG. 5 and the method 900 described with reference to FIG. 9 are omitted.

In the embodiment where the entity 1200 in which the RLC is located executes the method 500 described in FIG. 5, when the instructions are executed by the processor 1201, the entity 1200 in which the RLC is located performs the following operations: receiving the report configuration information, which includes an indication of the report information required to be obtained for the entity where the RLC is located, from the entity where the PDCP is located; sending the report information, which is used to assist the entity where the PDCP is located to determine activation or deactivation of data replication, to the entity where the PDCP is located; receiving the data replication activation threshold from the entity where the PDCP is located, where the data replication activation threshold is determined by the entity where the PDCP is located according to the channel quality related information of the transmission path of each entity where the RLC is located to which the entity where the PDCP is located is connected; and determining whether to activate uplink and/or downlink data replication according to the received data replication activation threshold.

In an exemplary embodiment, the report information includes at least one of:
 channel quality related information of the transmission path,
 indication information for activation or deactivation of uplink and/or downlink data replication, wherein the indication information is determined by the entity where the RLC is located according to channel quality related information of the transmission path and/or a data replication activation threshold.

In an exemplary embodiment, the channel quality related information of the transmission path includes at least one of:
 a measurement value of channel quality,
 a level of channel quality,
 a difference between the measurement value of channel quality and the data replication activation threshold.

In an exemplary embodiment, the report configuration information further includes at least one of:
 report trigger condition information; and
 the data replication activation threshold, where the data replication activation threshold is determined by the entity where the PDCP is located according to the channel quality related information of the transmission path of each entity where the RLC is located to which the entity where the PDCP is located is connected.

In an exemplary embodiment, when the instructions are executed by the processor 1201, the entity 1200 in which the RLC is located further performs the following operations:
 when it is determined to activate downlink data replication, sending replicated downlink data to the UE,
 when it is determined to activate uplink data replication, setting a MAC CE to indicate uplink data replication activation, and sending the MAC CE indicating activation of uplink data replication to the UE.

In an exemplary embodiment, when the instructions are executed by the processor 1201, the entity 1200 in which the RLC is located further performs the following operations:
 When it is determined that downlink data replication is to be activated, sending a downlink data replication activation indication to the entity where the PDCP is located,
 When it is determined to activate uplink data replication, setting a MAC CE to indicate uplink data replication activation, and sending the MAC CE indicating activation of uplink data replication and channel quality related information to the UE.

In an exemplary embodiment, in the case where the entity where the PDCP is located has determined that uplink data replication is to be activated according to the report information and selected transmission paths with the entities in which the RLCs are located as transmission paths for transmitting replicated uplink data, when the instructions are executed by the processor 1201, the entity 1200 in which the RLC is located further performs the following operations: receiving, from the entity where the PDCP is located, an uplink data replication activation indication for indicating to transmit replicated uplink data on the transmission path; according to the received uplink data replication activation indication, setting the MAC CE to indicate uplink data replication activation; and sending the MAC CE indicating uplink data replication activation to the UE.

In the embodiment where the entity 1200 in which the RLC is located performs the method 900 described in FIG. 9, when the instructions are executed by the processor 1201, the entity 1200 in which the RLC is located performs the following operations: receiving indication information for data replication; and counting data packets according to the indication information for data replication.

In an exemplary embodiment, the entity where the RLC is located receives the indication information for data replication through a message or through the user plane.

As mentioned above, the entity 1200 in which the RLC is located may be: a master base station, a secondary base station, or a distributed entity.

Figure 13:
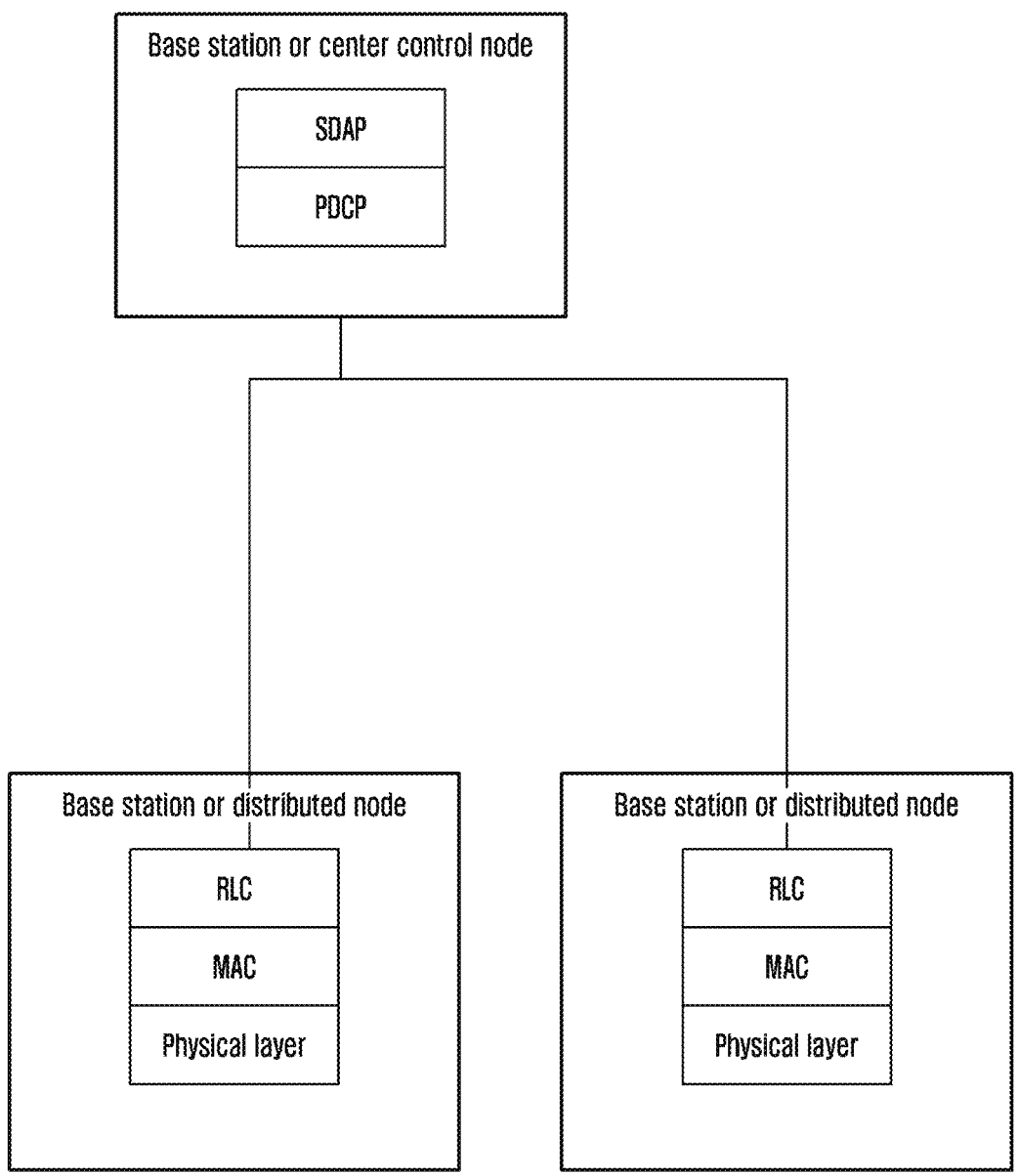
FIG. 13 schematically illustrates a structural block diagram of a base station according to an exemplary embodiment of the present disclosure.

FIG. 13 schematically illustrates a structural block diagram of a base station according to an exemplary embodiment of the present invention. As shown in FIG. 13, the master base station or the secondary base station includes SDAP, PDCP, or includes RLC, MAC, and the physical layer.

The program running on the device according to the present disclosure may be a program that causes a computer to implement the functions of the embodiments of the present disclosure by controlling a central processing unit (CPU). The program or the information processed by the program may be temporarily stored in volatile memory (such as random access memory RAM), hard disk drive (HDD), non-volatile memory (such as flash memory), or other memory systems.

A program for implementing the functions of the embodiments of the present disclosure may be recorded on a computer-readable recording medium. Corresponding functions may be realized by causing a computer system to read programs recorded on the recording medium and execute the programs. The so-called "computer system" herein may be a computer system embedded in the device, and may include an operating system or hardware (such as a peripheral device).The "computer-readable recording medium" may be a semiconductor recording medium, an optical recording medium, a magnetic recording medium, a recording medium for a short-term dynamic storage of program, or any other recording medium readable by a computer.

Various features or functional modules of the device used in the above-mentioned embodiments may be implemented or executed by a circuit (for example, a single chip or multiple integrated circuits). Circuits designed to perform the functions described in this specification may include general purpose processors, digital signal processors (DSPs), application specific integrated circuits (ASICs), field programmable gate arrays (FPGAs), or other programmable logic devices, discrete gates or transistor logics, discrete hardware components, or any combination of the above. A general-purpose processor may be a microprocessor, or any existing processor, controller, microcontroller, or state machine. The above circuit may be a digital circuit or an analog circuit. When new integrated circuit technologies that replace existing integrated circuits appear due to advances in semiconductor technology, one or more embodiments of the present disclosure may also be implemented using these new integrated circuit technologies.

In an embodiment of the present disclosure, a method for establishing a default radio data bearer on a secondary base station, comprises: receiving, from a master base station, a notification which notifies the secondary base station to establish the default radio data bearer; notifying the master base station of information about establishment of the default radio data bearer; and notifying the master base station of information about release of the default radio data bearer.

Wherein, the method may further comprise: receiving, from the master base station, a notification of an identifier of the default radio data bearer.

Wherein, the method may further comprise: receiving, from the master base station, a notification of information of an uplink tunnel corresponding to the established default radio data bearer.

Wherein, the method may further comprise: notifying the master base station that the information about establishment of the default radio data bearer comprises an identifier of the default radio data bearer.

Wherein, the method may further comprise: notifying the master base station of an identifier of a data stream on the default data bearer received by the secondary base station; receiving, from the master base station, a notification of information of an uplink tunnel corresponding to the data stream; and sending data of the data stream to the master base station.

In an embodiment of the present disclosure, a secondary base station, comprises: a processor; and a memory storing computer executable instructions that, when executed by the processor, cause the device to execute the method there above.

In an embodiment of the present disclosure, a method for data replication performed by an entity where Radio Link Control 'RLC' is located, comprises: receiving report configuration information from an entity where Packet Data Convergence Protocol 'PDCP' is located, the report configuration information including an indication of report information required to be obtained for the entity where the RLC is located; sending the report information to the entity where the PDCP is located; receiving a data replication activation threshold from the entity where the PDCP is located, wherein the data replication activation threshold is determined by the entity where the PDCP is located according to channel quality related information of a transmission path of each entity where the RLC is located to which the entity where the PDCP is located is connected; and determining whether to activate uplink and/or downlink data replication according to the received data replication activation threshold.

Wherein the report information may comprise at least one of: channel quality related information of the transmission path, indication information for activation or deactivation of uplink and/or downlink data replication, wherein the indication information may be determined by the entity where the RLC may be located according to the channel quality related information of the transmission path and/or the data replication activation threshold.

Wherein the channel quality related information of the transmission path may comprise at least one of: a measurement value of channel quality, a level of channel quality, a difference between the measurement value of channel quality and the data replication activation threshold.

Wherein the report configuration information may further comprise at least one of: report trigger condition information; and the data replication activation threshold.

Wherein, the method may further comprise: when it is determined to activate the downlink data replication, sending replicated downlink data to the UE, when it is determined to activate the uplink data replication, setting a MAC CE to indicate activation of the uplink data replication, and sending, to the UE, the MAC CE indicating the activation of the uplink data replication and signal quality related information.

Wherein, the method may further comprise: when it is determined to activate uplink data replication, setting the MAC CE to indicate uplink data replication activation, and sending, to the UE, the MAC CE indicating activation of uplink data replication and channel quality related information.

Wherein when the entity where the PDCP may be located determines to activate the uplink data replication according to the report information, and selects a transmission path connected to the entity where the RLC may be located as a transmission path for transmitting replicated uplink data, the method may further comprise: receiving, from the entity where the PDCP may be located, an uplink data replication activation indication for indicating to transmit the replicated uplink data on the transmission path; according to the received uplink data replication activation indication, setting the MAC CE to indicate the activation of the uplink data replication; and sending, to the UE, the MAC CE indicating the activation of the uplink data replication.

In an embodiment of the present disclosure, a data counting method performed by an entity where Radio Link Control 'RLC' is located, comprises: receiving indication information for data replication; and counting data packets according to the indication information for data replication.

Wherein the entity where the RLC is located may receive the indication information for data replication through a message or through a user plane.

Wherein, the entity where PDCP is located, may comprise one of: a master base station, a secondary base station, a center control node.

In an embodiment of the present disclosure, an entity where Radio Link Control 'RLC' is located, comprises: a processor; and a memory storing computer executable instructions that, when executed by the processor, cause the entity to execute the method there above.

Wherein, the entity where PDCP is located, may comprise one of: a master base station, a secondary base station, a distributed entity.

In an embodiment of the present disclosure, a computer readable medium having stored thereon instructions which, when executed by a processor, cause the processor to perform the method there above.

As above, the embodiments of the present disclosure have been described in detail with reference to the drawings. However, the specific structure is not limited to the above-mentioned embodiments, and the present disclosure also includes any design changes without departing from the gist of the present disclosure. In addition, various modifications may be made to the present disclosure within the scope of the claims, and the embodiments obtained by appropriately combining the technical means disclosed in different embodiments are also included in the technical scope of the present disclosure. In addition, components having the same effects described in the above embodiments may be replaced with each other.

The above description is only a preferred embodiment of the present application and an explanation of the applied technical principles. Those skilled in the art should understand that the scope of the invention involved in this disclosure is not limited to the technical solution of the specific combination of the above technical features, but also covers other technical solutions formed by any combination of the above technical features or equivalent features without departing from the concept of the present disclosure. For example, a technical solution formed by replacing the above features with technical features disclosed in this application (but not limited to) with similar functions.

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Various embodiments of the present application can be used for wireless communication.

The invention claimed is:

1. A method performed by a master base station in a wireless communication system, the method comprising:
   transmitting, to a secondary base station, a request message including first information indicating the secondary base station to configure a default data radio bearer (DRB);
   receiving, from the secondary base station, a response message including an identifier of the default DRB configured by the secondary base station;
   transmitting, to a terminal, a message for notifying an establishment of the default DRB configured by the secondary base station;
   receiving, from the secondary base station, a modification requirement message including an identifier of a DRB to be released among DRBs configured on the secondary base station; and
   transmitting, to the secondary base station, a modification confirmation message.

2. The method of claim 1,
   wherein the request message includes an identifier of a default DRB configured by the master base station, an identifier of a quality of service (QoS) flow established on the secondary base station, and identifications of DRBs available to a secondary base station terminated bearer.

3. The method of claim 1, further comprising:
   receiving, from the secondary base station, an identifier of a data stream on the default DRB, the data stream being received by the secondary base station;
   transmitting, to the secondary base station, information associated with an uplink tunnel corresponding to the data stream; and
   receiving, from the secondary base station, data of the data stream.

4. The method of claim 1, further comprising:
   determining whether to configure the default DRB by the secondary base station,
   wherein in case that all data streams of a packet data unit (PDU) session are established on the secondary base station, the master base station determines to configure the default DRB by the secondary base station.

5. The method of claim 1,
wherein the modification requirement message further includes indication information of the default DRB or an identifier of a quality of service (QoS) flow to be released, and
wherein the DRB to be released includes the default DRB.

6. A master base station in a wireless communication system, the master base station comprising:
a transceiver configured to transmit and receive a signal; and
a controller configured to:
transmit, to a secondary base station, a request message including first information indicating the secondary base station to configure a default data radio bearer (DRB),
receive, from the secondary base station, a response message including an identifier of the default DRB configured by the secondary base station,
transmit, to a terminal, a message for notifying an establishment of the default DRB configured by the secondary base station,
receive, from the secondary base station, a modification requirement message including an identifier of a DRB to be release among DRBs configured on the secondary base station, and
transmit, to the secondary base station, a modification confirmation message.

7. The master base station of claim 6,
wherein the request message includes an identifier of a default DRB configured by the master base station, an identifier of a quality of service (QoS) flow established on the secondary base station, and identifications of DRBs available to a secondary base station terminated bearer.

8. The master base station of claim 6, wherein the controller is further configured to:
receive, from the secondary base station, an identifier of a data stream on the default DRB, the data stream being received by the secondary base station,
transmit, to the secondary base station, information associated with an uplink tunnel corresponding to the data stream, and
receive, from the secondary base station, data of the data stream.

9. A method performed by a secondary base station in a wireless communication system, the method comprising:
receiving, from a master base station, a request message including first information indicating the secondary base station to configure a default data radio bearer (DRB);
configuring the default DRB based on the first information;
transmitting, to the master base station, a response message including an identifier of the default DRB configured by the secondary base station;
transmitting, to the master base station, a modification requirement message including an identifier of a DRB to be release among DRBs configured on the secondary base station; and
receiving, from the master base station, a modification confirmation message.

10. The method of claim 9,
wherein the request message includes an identifier of a default DRB configured by the master base station, an identifier of a quality of service (QoS) flow established on the secondary base station, and identifications of DRBs available to a secondary base station terminated bearer.

11. The method of claim 9, further comprising:
transmitting, to the master base station, an identifier of a data stream on the default DRB, the data stream being received by the secondary base station;
receiving, from the master base station, information associated with an uplink tunnel corresponding to the data stream; and
transmitting, to the master base station, data of the data stream.

12. The method of claim 9,
wherein in case that all data streams of a packet data unit (PDU) session are established on the secondary base station, the default DRB is configured by the secondary base station.

13. The method of claim 9,
wherein the modification requirement message further includes indication information of the default DRB or an identifier of a quality of service (QoS) flow to be released, and
wherein the DRB to be released includes the default DRB.

14. A secondary base station in a wireless communication system, the secondary base station comprising:
a transceiver configured to transmit and receive a signal; and
a controller configured to:
receive, from a master base station, a request message including first information indicating the secondary base station to configure a default data radio bearer (DRB),
configure the default DRB based on the first information,
transmit, to the master base station, a response message including an identifier of the default DRB configured by the secondary base station,
transmit, to the master base station, a modification requirement message including an identifier of a DRB to be release among DRBs configured on the secondary base station, and
receive, from the master base station, a modification confirmation message.

15. The secondary base station of claim 14,
wherein the request message includes an identifier of a default DRB configured by the master base station, an identifier of a quality of service (QoS) flow established on the secondary base station, and identifications of DRBs available to a secondary base station terminated bearer.

16. The secondary base station of claim 14, wherein the controller is further configured to:
transmit, to the master base station, an identifier of a data stream on the default DRB, the data stream being received by the secondary base station,
receive, from the master base station, information associated with an uplink tunnel corresponding to the data stream, and
transmit, to the master base station, data of the data stream.

* * * * *